(12) United States Patent
Galpin et al.

(10) Patent No.: US 11,997,279 B2
(45) Date of Patent: May 28, 2024

(54) AFFINE MODE SIGNALING IN VIDEO ENCODING AND DECODING

(71) Applicant: InterDigital VC Holdings, Inc., Wilmington, DE (US)

(72) Inventors: Franck Galpin, Thorigne-Fouillard (FR); Fabrice Le Leannec, Mouaze (FR); Philippe Bordes, Laille (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/282,919

(22) PCT Filed: Oct. 9, 2019

(86) PCT No.: PCT/US2019/055468
§ 371 (c)(1),
(2) Date: Apr. 5, 2021

(87) PCT Pub. No.: WO2020/077003
PCT Pub. Date: Apr. 16, 2020

(65) Prior Publication Data
US 2021/0392329 A1    Dec. 16, 2021

(30) Foreign Application Priority Data
Oct. 10, 2018  (EP) .................................... 18306339

(51) Int. Cl.
*H04N 19/13*        (2014.01)
*H04N 19/105*       (2014.01)
(Continued)

(52) U.S. Cl.
CPC .......... *H04N 19/13* (2014.11); *H04N 19/105* (2014.11); *H04N 19/159* (2014.11); *H04N 19/172* (2014.11); *H04N 19/46* (2014.11)

(58) Field of Classification Search
CPC .... H04N 19/13; H04N 19/105; H04N 19/159; H04N 19/172; H04N 19/46;
(Continued)

(56) References Cited

U.S. PATENT DOCUMENTS 11,323,736 B2   5/2022   Chen et al.
11,706,417 B2   7/2023   Chen et al.
(Continued)

FOREIGN PATENT DOCUMENTS

AU   2018283967 A1 * 12/2019 ........... H04N 19/176
CN      106559669 A      4/2017
(Continued)

OTHER PUBLICATIONS

Haitao Yang et al.; CE4: Summary Report on Inter Prediction Motion Vector Coding; JVET-L0024-v2, Macao, CN, Oct. 3-12, 2018 (Year: 2018).*

(Continued)

*Primary Examiner* — Dramos Kalapodas
(74) *Attorney, Agent, or Firm* — CONDO ROCCIA KOPTIW LLP

(57) ABSTRACT

In general, encoding or decoding a picture part can involve a first CABAC probability model associated with a first flag indicating use of an affine mode and a second CABAC probability model associated with a second flag indicating use of either the affine mode or a second mode different from the affine mode, where the first and second CABAC probability models are different and are determined independently.

21 Claims, 15 Drawing Sheets

(51) Int. Cl.
*H04N 19/159* (2014.01)
*H04N 19/172* (2014.01)
*H04N 19/46* (2014.01)

(58) Field of Classification Search
CPC .. H04N 19/157; H04N 19/176; H04N 19/463; H04N 19/91; H04N 19/70; H04N 19/139; H04N 19/184; H04N 19/52; H04N 19/182; H04N 19/192; H04N 19/21; H04N 19/513
See application file for complete search history.

(56) References Cited

U.S. PATENT DOCUMENTS

| | | | |
|---|---|---|---|
| 2013/0004092 A1 | 1/2013 | Sasai et al. | |
| 2013/0195199 A1 | 8/2013 | Guo et al. | |
| 2017/0332095 A1* | 11/2017 | Zou | H04N 19/537 |
| 2018/0084260 A1* | 3/2018 | Chien | H04N 19/52 |
| 2018/0091816 A1 | 3/2018 | Chien et al. | |
| 2018/0098063 A1 | 4/2018 | Chen et al. | |
| 2018/0205965 A1* | 7/2018 | Chen | H04N 19/107 |
| 2019/0028731 A1* | 1/2019 | Chuang | H04N 19/176 |
| 2019/0058896 A1* | 2/2019 | Huang | H04N 19/61 |
| 2019/0104319 A1* | 4/2019 | Zhang | H04N 19/137 |
| 2019/0110064 A1* | 4/2019 | Zhang | H04N 19/184 |
| 2019/0335170 A1* | 10/2019 | Lee | H04N 19/52 |
| 2019/0342547 A1 | 11/2019 | Lee et al. | |
| 2020/0260111 A1* | 8/2020 | Liu | H04N 19/527 |
| 2021/0185328 A1* | 6/2021 | Xu | H04N 19/86 |
| 2021/0281838 A1* | 9/2021 | Lee | H04N 19/176 |
| 2022/0030269 A1* | 1/2022 | Laroche | H04N 19/176 |

FOREIGN PATENT DOCUMENTS

| | | | | |
|---|---|---|---|---|
| CN | 108432250 A | | 8/2018 | |
| CN | 108605137 A | | 9/2018 | |
| CN | 112040247 B | * | 9/2021 | H04N 19/117 |
| GB | 2579763 A | * | 7/2020 | H04N 19/13 |
| WO | 2013/001770 A1 | | 1/2013 | |
| WO | 2017054630 A1 | | 4/2017 | |
| WO | 2018128379 A1 | | 7/2018 | |
| WO | 2018128380 A1 | | 7/2018 | |
| WO | WO-2018174618 A1 | * | 9/2018 | H04N 19/103 |
| WO | WO-2019070683 A1 | * | 4/2019 | H04N 19/105 |
| WO | 2020/052534 A1 | | 3/2020 | |

OTHER PUBLICATIONS

Galpin (Technicolor) et al.; "CE4-Related: Simplified Constructed Temporal Affine Merge Candidates", 12. JVET Meeting; Oct. 3, 2018-Oct. 12, 2018; Macao; JVET-L0522, Oct. 5, 2018, XP030194969 (Year: 2018).*

Interdigital, Inc. "Non-CE4: Affine and sub-block modes coding clean-up", JVET of ITU-T SG16 WP3 and ISO/IEC JTC 1/SC29/WG11, 15th Meeting: Gothenburg, SE, Jul. 3-12, 2019, Document: JVET-O0500, 4 pages.

Yang, Haitao, et al., "CE4: Summary report on inter prediction and motion vector coding", JVET of ITU-T SG16 WP3 and ISO/IEC JTC 1/SC 29/WG11, 12th Meeting: Macao, CN, Oct. 3-12, 2018, Document: JVET-L0024-v2, 48 pages.

Technicolor, "Context Reduction for Inter and Split Syntax Elements", JVET of ITU-T SG16 WP3 and ISO/IEC JTC 1/SC29/WG11, 14th Meeting: Geneva, CH, Mar. 19-27, 2019, Document: JVET-N0600, 8 pages.

Technicolor, "CE4-related: simplified constructed temporal affine merge candidates", JVET of ITU-T SG16 WP3 and ISO/IEC JTC 1/SC 29/WG11, 12th Meeting: Macao, CN, Oct. 3-12, 2018, Document: JVET-L0522-v2, 4 pages.

Bross, et al., "Versatile Video Coding (Draft 2); Document: JVET-K1001-v6", Joint Video Experts Team (JVET) of ITU-T SG 16 WP 3 and ISO/IEC JTC 1/SC 29/WG11, 11th Meeting: Ljubljana, SI, Jul. 10-18, 2018, 140 pages.

ITU-T, "High Efficiency Video Coding", H.265, Series H: Audio-visual and Multimedia Systems, Infrastructure of Audiovisual Services—Coding of Moving Video, Apr. 2015, 634 pages.

Yang, et al., "Description of Corn Experiment 4 (CE4): Inter Prediction and Motion Vector Coding", JVET-K1024-V3, Joint Video Experts Team (JVET) of ITU-T SG 16 WP 3 and ISO/IEC JTC 1 /SC 29/WG 11, 11th Meeting: Ljubljana, Slovenia, Jul. 10, 2018, 45 pages.

PatBase English Language Translation of WO 2018174618 A1.

* cited by examiner

AFFINE MODE SIGNALING IN VIDEO ENCODING AND DECODING

CROSS REFERENCE TO RELATED APPLICATIONS

This application is the National Stage Entry under 35 U.S.C. § 371 of Patent Cooperation Treaty Application No. PCT/US2019/055468, filed Oct. 9, 2019, which claims priority from European Patent Application No. 18306339.5, filed Oct. 10, 2018, the contents of which are hereby incorporated by reference herein in their entireties.

TECHNICAL FIELD

The present disclosure involves video encoding and decoding.

BACKGROUND

To achieve high compression efficiency, image and video coding schemes such as that defined by the HEVC (High Efficiency Video Coding) standard usually employ predictive and transform coding to leverage spatial and temporal redundancy in the video content. Generally, intra or inter prediction is used to exploit the intra or inter frame correlation, then the differences between the original blocks and the predicted blocks, often denoted as prediction errors or prediction residuals, are transformed, quantized, and entropy coded. To reconstruct the video, the compressed data is decoded by inverse processes corresponding to the prediction, transform, quantization, and entropy coding. Recent additions to video compression technology include various versions of the reference software and/or documentation of the Joint Exploration Model (JEM) being developed by the Joint Video Exploration Team (WET). An aim of efforts such as JEM is to make further improvements to existing standards such as HEVC.

SUMMARY

In general, at least one example of an embodiment involves a method for encoding video data comprising determining a first CABAC context associated with a first flag indicating use of an affine mode; determining a second CABAC context associated with a second flag indicating use of either the affine mode or a second mode different from the affine mode; wherein the first CABAC context corresponds to a first CABAC probability model; and the second CABAC context corresponds to a second CABAC probability model different from the first CABAC probability model; encoding the video data based on the first CABAC context and the first CABAC probability model during the affine mode and based on the second CABAC context and the second CABAC probability model during the second mode.

In general, at least one example of an embodiment involves a method for decoding video data comprising determining a first CABAC context associated with a first flag indicating use of an affine mode; determining a second CABAC context associated with a second flag indicating use of either the affine mode or a second mode different from the affine mode; wherein the first CABAC context corresponds to a first CABAC probability model; and the second CABAC context corresponds to a second CABAC probability model different from the first CABAC probability model; decoding the video data based on the first CABAC context and the first CABAC probability model for decoding video data encoded during the affine mode and based on the second CABAC context and the second CABAC probability model for decoding video data encoded during the second mode.

In general, at least one example of an embodiment involves apparatus for encoding video data comprising at least one or more processors, wherein the one or more processors are configured for: determining a first CABAC context associated with a first flag indicating use of an affine mode; determining a second CABAC context associated with a second flag indicating use of either the affine mode or a second mode different from the affine mode; wherein the first CABAC context corresponds to a first CABAC probability model; and the second CABAC context corresponds to a second CABAC probability model different from the first CABAC probability model; encoding the video data based on the first CABAC context and the first CABAC probability model during the affine mode and based on the second CABAC context and the second CABAC probability model during the second mode.

In general, at least one example of an embodiment involves apparatus for decoding video data comprising one or more processors, wherein the one or more processors are configured for: determining a first CABAC context associated with a first flag indicating use of an affine mode; determining a second CABAC context associated with a second flag indicating use of either the affine mode or a second mode different from the affine mode; wherein the first CABAC context corresponds to a first CABAC probability model; and the second CABAC context corresponds to a second CABAC probability model different from the first CABAC probability model; decoding the video data based on the first CABAC context and the first CABAC probability model for decoding video data encoded during the affine mode and based on the second CABAC context and the second CABAC probability model for decoding video data encoded during the second mode.

In general, at least one example of an embodiment involves a device such as, but not limited to, a television, set-top box, cell phone, tablet, or other electronic device that performs any of the embodiments described and/or displays (e.g. using a monitor, screen, or other type of display) a resulting image and/or tunes (e.g. using a tuner) a channel to receive a signal including an encoded image and/or receives (e.g. using an antenna) a signal over the air that includes an encoded image, and performs any of the embodiments described.

In general, at least one example of an embodiment involves a bitstream formatted to include encoded video data, wherein the encoded video data are encoded by at least one method described herein.

In general, at least one example of an embodiment provides a computer readable storage medium having stored thereon instructions for encoding or decoding video data according to the methods or the apparatuses described herewith.

In general, at least one example of an embodiment provides a computer readable storage medium having stored thereon a bitstream generated according to the methods or the apparatuses described herewith.

In general, various examples of embodiments provide methods and/or apparatuses for transmitting or receiving the bitstream generated according to methods or apparatuses described herein.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below

BRIEF DESCRIPTION OF THE DRAWINGS

The present disclosure may be better understood by consideration of the detailed description below in conjunction with the accompanying figures, in which.

It should be understood that the drawings are for purposes of illustrating examples of various aspects, embodiments and features and are not necessarily the only possible configurations. Throughout the various figures, like reference designators refer to the same or similar features.

DETAILED DESCRIPTION

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction. The entropy coding/decoding typically involves context-adaptive binary arithmetic coding (CABAC).

A recent addition to high compression technology includes using a motion model based on affine modeling. Affine modeling is used for motion compensation for encoding and decoding of video pictures. In general, affine modeling is a model using at least two parameters such as, e.g., two control point motion vectors (CPMVs) representing the motion at the respective corners of a block of picture, that allows deriving a motion field for the whole block of a picture to simulate, e.g., rotation and homothety (zoom).

The general aspects described here are in the field of video compression. These aspects aim at improving compression efficiency compared to existing video compression systems.

In the HEVC video compression standard (H.265/HEVC High Efficiency Video Coding, ITU-T H.265 Telecommunication Standardization Sector of ITU, "Series H: Audiovisual and Multimedia Systems, Infrastructure of audiovisual services—Coding of moving video, High efficiency video coding."), motion compensated temporal prediction is employed to exploit the redundancy that exists between successive pictures of a video.

Figure 1:
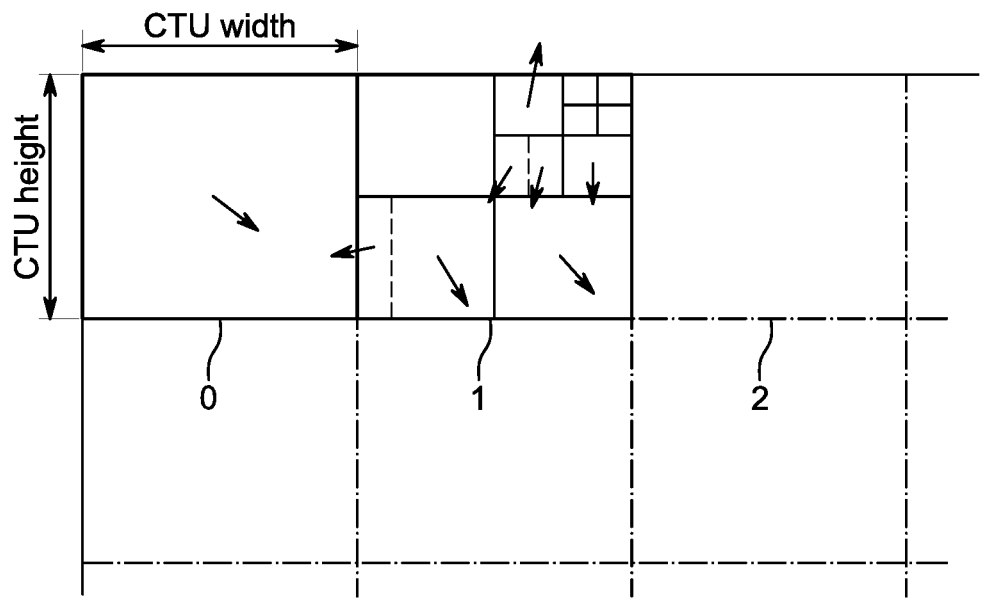
FIG. 1 illustrates partitioning video information for video encoding and decoding involving a Coding Tree Unit (CTU) as in HEVC.

To do so, a motion vector is associated to each prediction unit (PU), which is introduced now. Each CTU (Coding Tree Unit) is represented by a Coding Tree in the compressed domain. This is a quad-tree division of the CTU, where each leaf is called a Coding Unit (CU), see FIG. 1.

Figure 2:
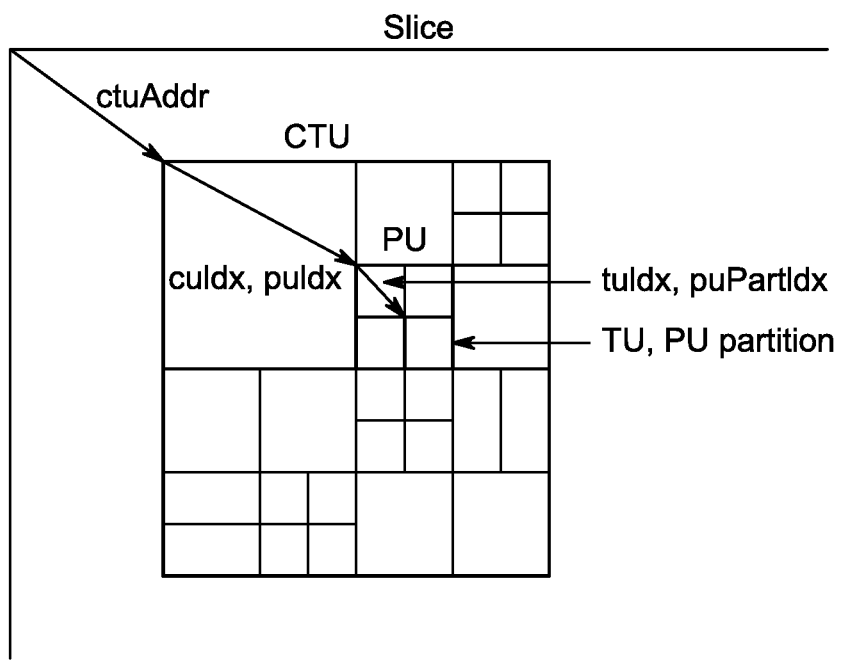
FIG. 2 illustrates partitioning video information for video encoding and decoding involving a CTU and Coding Unit (CU)

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Exactly one Motion Vector is assigned to each PU in HEVC. This motion vector is used for motion compensated temporal prediction of the considered PU. Therefore, in HEVC, the motion model that links a predicted block and its reference block simply involves a translation.

In the Joint Exploration Model (JEM) and later VTM (Versatile Video Coding (VVC) Test Model) developed by the JVET (Joint Video Exploration Team) group, some richer motion models are supported to improve temporal prediction. To do so, a PU can be spatially divided into sub-PU and a richer model can be used to assign each sub-PU a dedicated motion vector.

A CU is no longer divided into PU or TU, and some motion data is directly assigned to each CU. In this new codec design, a CU can be divided into sub-CU and a motion vector can be computed for each sub-CU.

One of the new motion models introduced in the JEM is the affine model, which basically involves using an affine model to represent the motion vectors in a CU.

Figure 3:
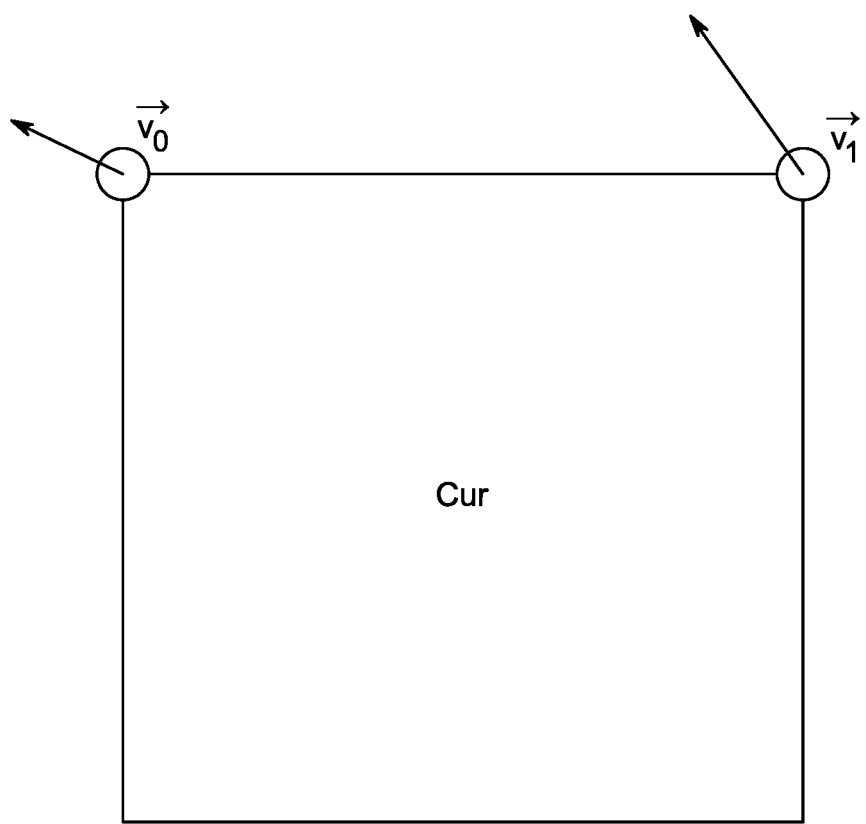
FIG. 3 illustrates aspects of an affine motion model.

The motion model used is illustrated by FIG. 3. The affine motion field involves the following motion vector component values for each position (x,y) inside the considered block:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \qquad \text{Equation 1}$$

affine model used to generate

-continued the motion field inside a CU to predict

Coordinates $(v_{0x}, v_{0y})$ and $(v_{1x}, v_{1y})$ are the so-called control point motion vectors used to generate the affine motion field. The point $(v_{0x}, v_{0y})$ is the motion vector top-left corner control point and $(v_{1x}, v_{1y})$ is the motion vector top-right corner control point.

Figure 4:
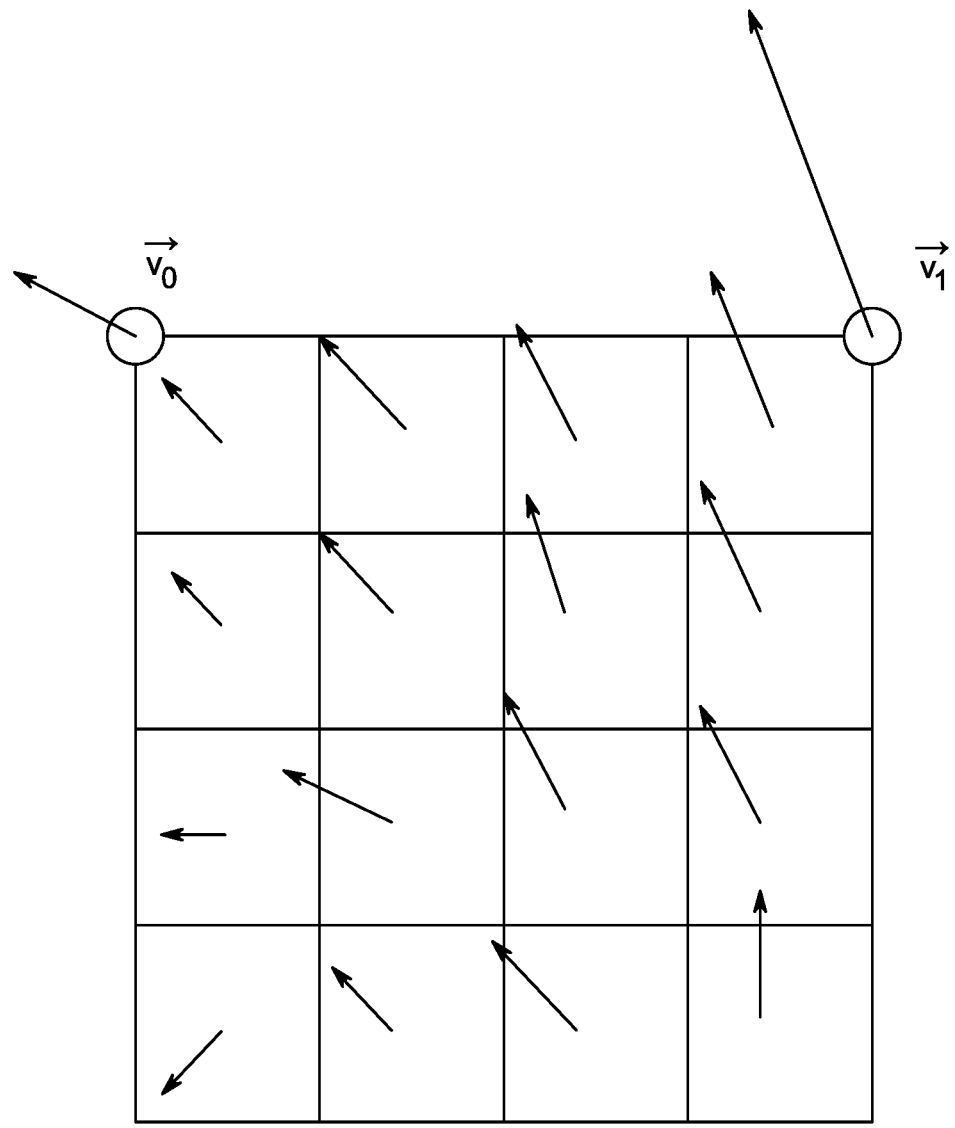
FIG. 4 illustrates an embodiment involving an affine motion model.

In practice, to keep complexity reasonable, a motion vector is computed for each 4×4 sub-block (sub-CU) of the considered CU, as illustrated on FIG. 4. An affine motion vector is computed from the control point motion vectors, at the position of the center of each sub-block. The obtained MV is represented at ¹⁄₁₆-pixel accuracy.

As a result, the temporal coding of a coding unit in the affine mode comprises in motion compensated predicting each sub-block with its own motion vector.

Note that a model with three control points is also possible.

Affine motion compensation can be used in two ways in the VTM: Affine Inter (AF_INTER), Affine Merge and Affine Template. They are introduced in the following.

Figure 5:
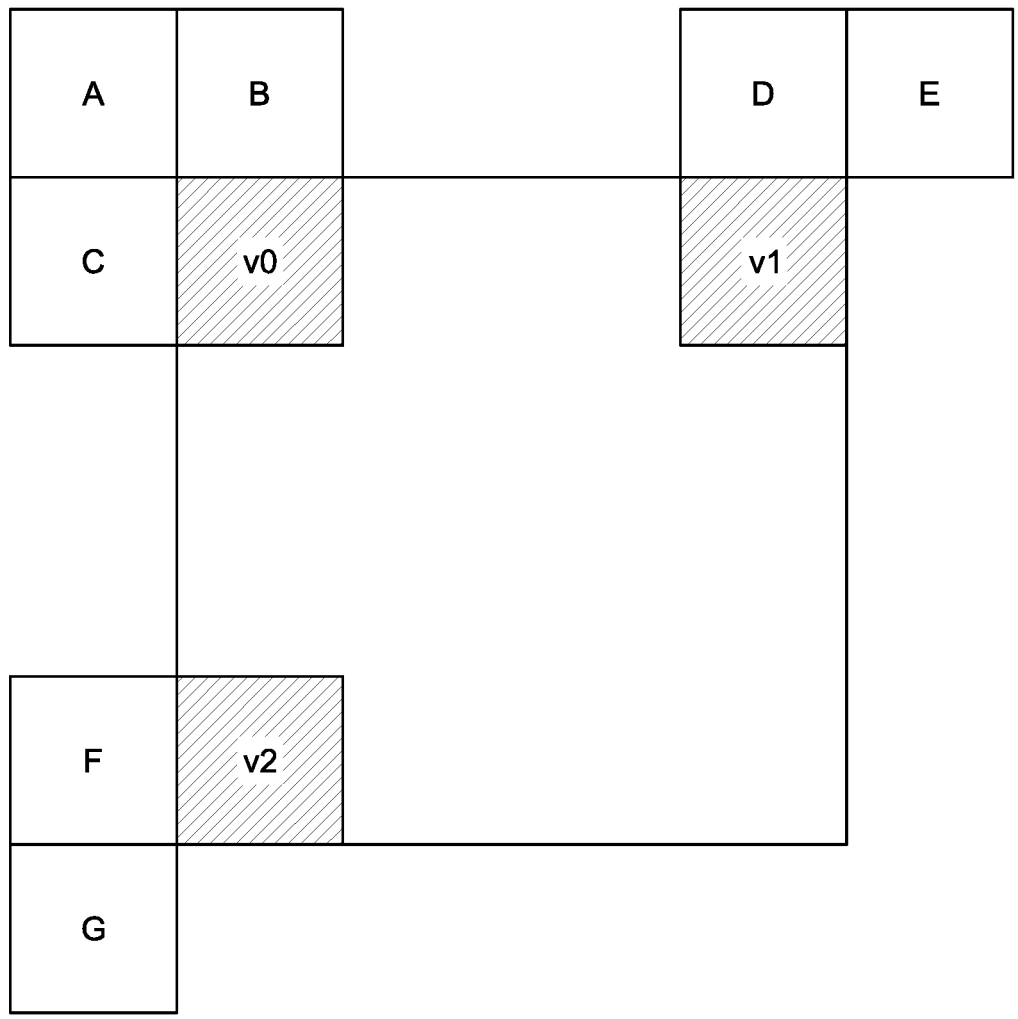
FIG. 5 illustrates control point motion vector prediction (CPMVP) associated with an Affine Inter mode.

Affine Inter (AF_INTER):

A CU in AMVP mode, having size larger than 8×8, can be predicted in Affine Inter mode. This is signaled through a flag in the bit-stream. The generation of the Affine Motion Field for that inter CU includes determining control point motion vectors (CPMV), which are obtained by the decoder through the addition of a motion vector difference and a control point motion vector prediction (CPMVP). The CPMVP is a pair of motion vector candidates, respectively taken from the list (A, B, C) and (D, E), as illustrated in FIG. 5.

Up to 6 CPMVP may be obtained (3 for $\vec{v_0}$ multiplied by 2 for $\vec{v_1}$).

First CPMVP are checked for validity using Equation 2, for a block of height H and Width W:

$$\overrightarrow{\Delta Hor} = \vec{v1} - \vec{v0} \quad \text{Equation 2}$$
$$DiffH = \frac{W}{2}$$
$$DiffV = \frac{H}{2}$$
$$\text{validity} = \overrightarrow{\Delta Hor} != \vec{0} \;\&\&\; \text{abs}(\overrightarrow{\Delta Hor} \cdot X) \leq DiffH \;\&\&$$
$$\text{abs}(\overrightarrow{\Delta Hor} \cdot Y) \leq DiffV \;\&\&$$
$$\text{abs}(\overrightarrow{\Delta Ver} \cdot X) \leq DiffH \;\&\&\; \text{abs}(\overrightarrow{\Delta Ver} \cdot Y) \leq DiffV$$

Validity test for each CPMVP

Valid CPMVP are then sorted depending on the value of a third motion vector $\vec{v_2}$, (taken from position F or G). The closest $\vec{v_2}$ is to the vector given by the affine motion model for the 4×4 sub-block at the same position $\vec{v_2}$, as the better is the CPMVP.

For a block of Height H and Width W, the cost of each CPMVP is computed with Equation 3. In the following equation X and Y are respectively the horizontal and vertical components of a motion vector.

$$\overrightarrow{\Delta Hor} = \vec{v1} - \vec{v0} \quad \text{Equation 3}$$
$$\overrightarrow{\Delta Ver} = \vec{v2} - \vec{v0}$$
$$\text{cost} = \text{abs}(\overrightarrow{\Delta Hor} \cdot X * H - \overrightarrow{\Delta Ver} \cdot Y * W) +$$
$$\text{abs}(\overrightarrow{\Delta Hor} \cdot Y * H + \overrightarrow{\Delta Ver} \cdot X * W)$$

Cost computed for each CPMVP

Figure 6:
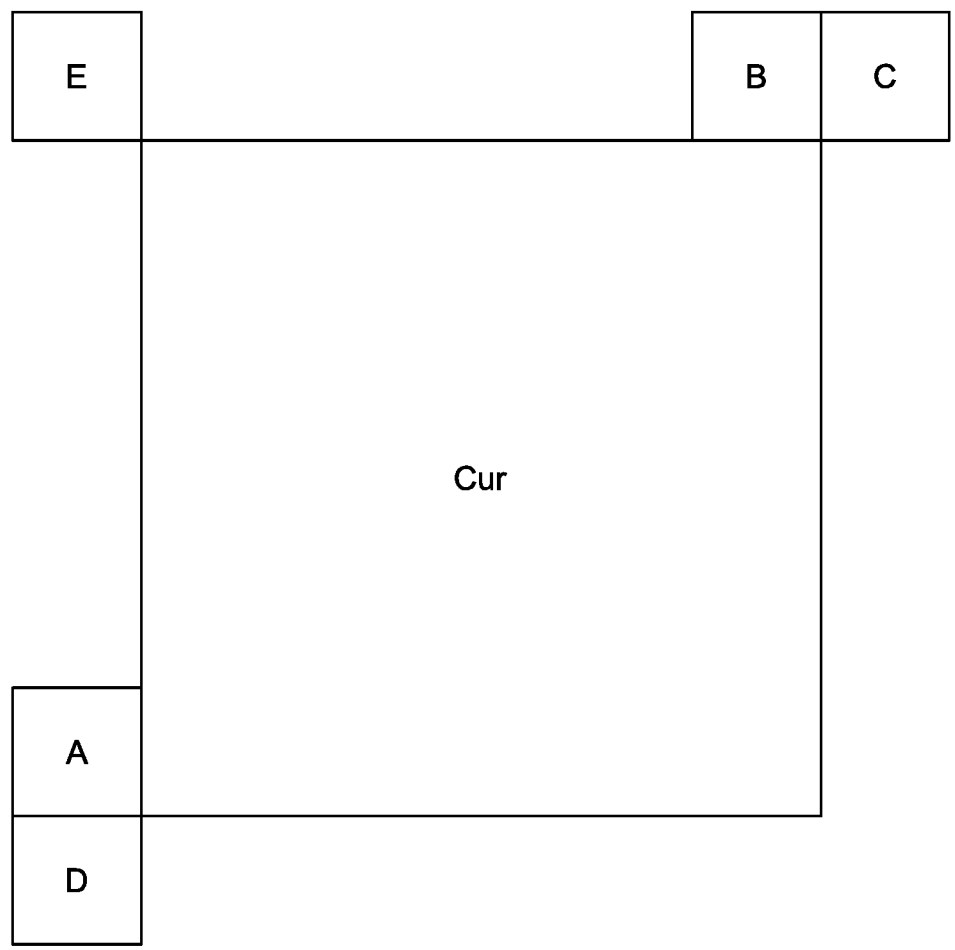
FIG. 6 illustrates candidate positions associated with an Affine Merge mode.

Affine Merge:

In Affine Merge mode, a CU-level flag indicates if a merge CU employs affine motion compensation. If so, then the first available neighboring CU that has been coded in an Affine mode is selected among the ordered set of candidate positions (A, B, C, D, E) of FIG. 6.

Figure 7:
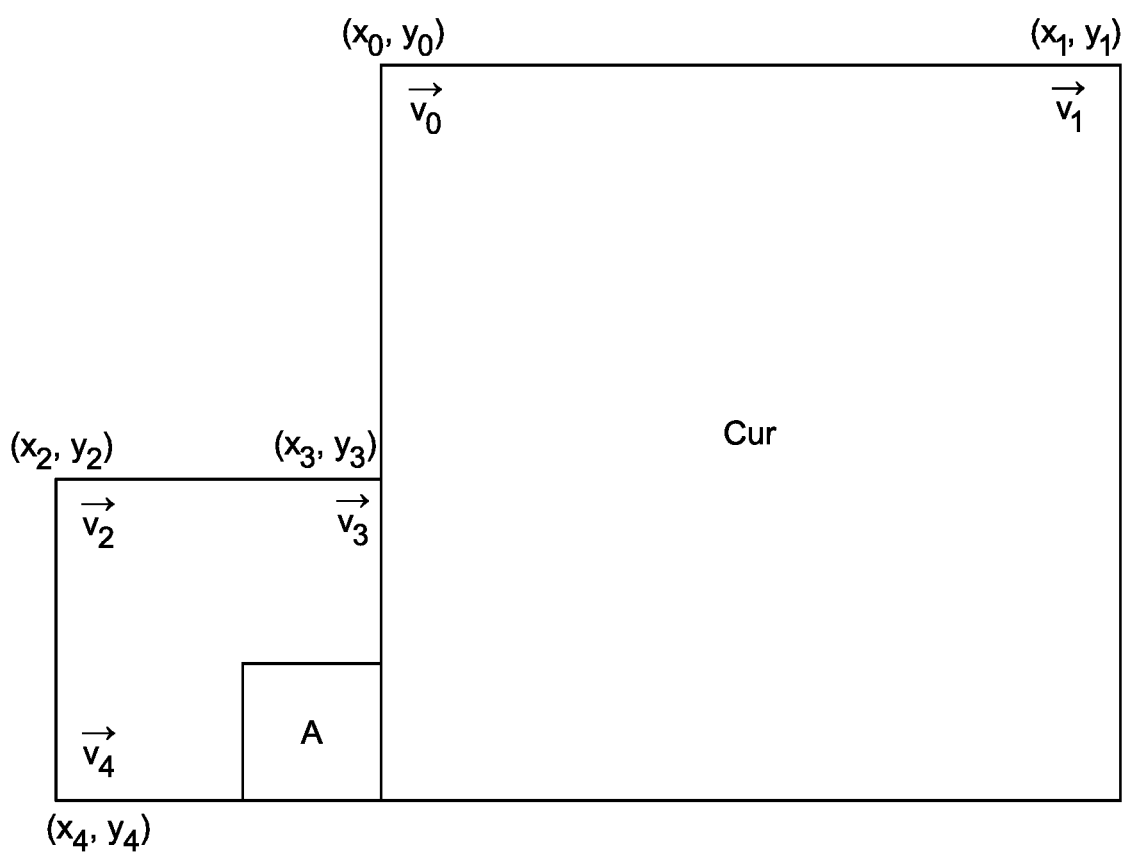
FIG. 7 illustrates motion vectors involved in determining control point motion vectors (CPMV) during Affine Merge mode.

Once the first neighboring CU in Affine mode is obtained, then the 3 motion vectors $\vec{v_2}$, $\vec{v_3}$, and $\vec{v_4}$ from the top-left, top-right and bottom-left corners of the neighboring CU are retrieved (see FIG. 7). Based on these three vectors, the two CPMV of the top-left and top-right corners of current CU are derived as follows:

$$\vec{v_0} = \quad \text{Equation 4}$$
$$\vec{v_2} + (\vec{v_4} - \vec{v_2})\left(\frac{Y_{curr} - Y_{neighb}}{H_{neighb}}\right) + (\vec{v_3} - \vec{v_2})\left(\frac{X_{curr} - X_{neighb}}{W_{neighb}}\right)$$
$$\vec{v_1} = \vec{v_0} + (\vec{v_3} - \vec{v_2})\left(\frac{W_{curr}}{W_{neighb}}\right)$$

derivation of current CU's CPMV based on the three corner motion vectors of the neighboring CU When the control point motion vectors $\vec{v_0}$ and $\vec{v_1}$ of a current CU are obtained, the motion field inside the current CU is computed on a 4×4 sub-CU basis, through the model of Equation 1.

More candidates can be added for Affine merge mode, selecting the best candidate among a maximum of 7 candidates and coding the index of the best candidate in the bitstream.

Another type of candidate is called temporal affine. Similar to TMVP (Temporal Motion Vector Predictor) candidates, affine CU are searched in reference images and added to the candidates list.

A process can create "virtual" affine candidates to be added. Such a process may be useful to create affine candidates when no affine CU are available around the current CU. To do so, an affine model is created by taking the motion of individual sub-blocks at the corner and creating an "affine" model.

During the candidate list creation, there are two constraints to consider for complexity reasons:
- The total number of potential candidates: increase the total computation need
- The final list size: increase the delay at decoder by increasing the number of comparisons needed for each successive candidate In general, at least one embodiment involves video coding using affine flag coding for motion compensation. The affine flag is known in the context of a video coding system such as VVC. The affine flag signals, at the coding unit (CU) level, the use or not of affine motion compensation for the temporal prediction of the current CU. In the following description, a coding unit is called a coding unit, a CU or a block.

In Inter mode, the affine flag signals the use of an affine motion field to predict a block as described above. An affine motion model is using four or six parameters, typically, as described above. This mode is used both in AMVP, where a mvd is coded (motion vector difference with motion predictor) and in merge (mvd inferred to zero). In general, at least one example of an embodiment described herein can also apply to other modes such as mmvd (merge motion vector difference, also known as UMVE) where the mvd can be signaled with merge mode, or DMVR (decoder side motion refinement) where a motion predictor is refined at the decoder side. In general, at least one embodiment provides for improving the coding of the affine flag.

The affine flag is currently signaled using a CABAC context. To encode with CABAC, a non-binary syntax element value is mapped to a binary sequence, called a bin string, through a binarization process. For a bin, a context model is selected. A "context model" is a probability model for one or more bins and is chosen from a selection of available models depending on the statistics of recently coded symbols. The context model of each bin is identified by a context model index (also used as "context index"), and different context indices correspond to different context models. The context model stores the probability of each bin being '1' or '0', and can be adaptive or static. The static model triggers a coding engine with an equal probability for bins '0' and '1'. In the adaptive coding engine, the context model is updated based on the actual coded value of a bin. The operation modes corresponding to the adaptive and static models are called the regular mode and the bypass mode, respectively. Based on the context, a binary arithmetic coding engine encodes or decodes a bin according to the corresponding probability model.

Figure 8:
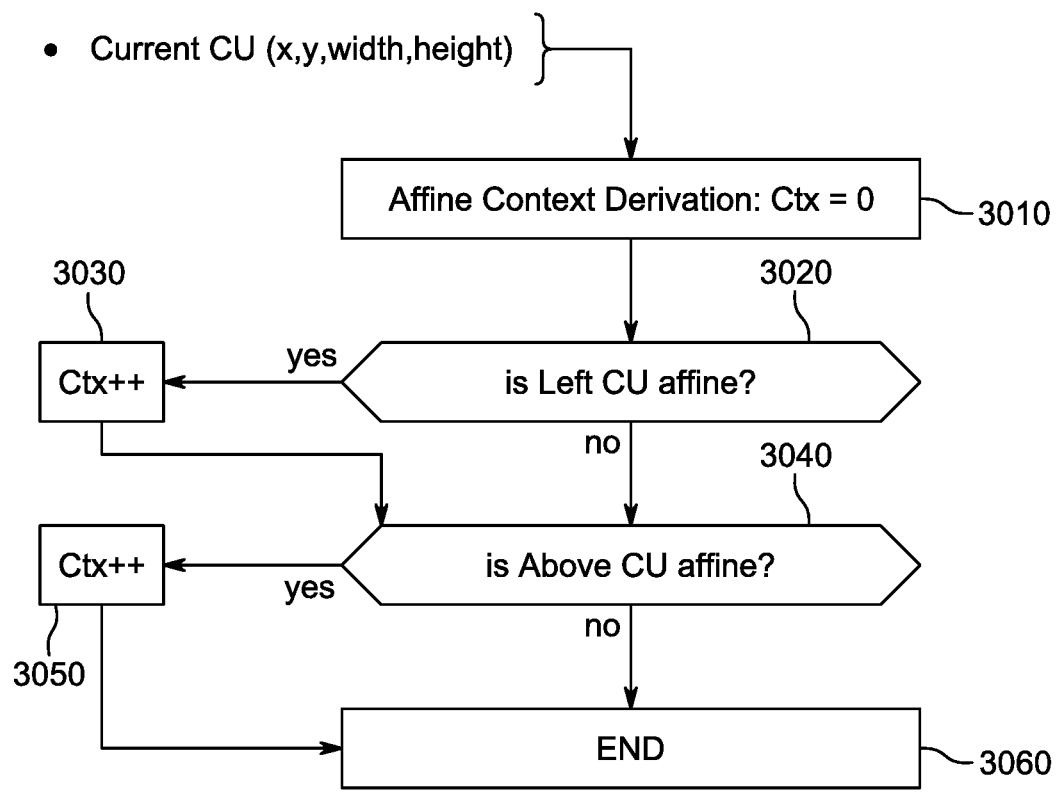
FIG. 8 illustrates an example of an embodiment for determining a context associated with a flag such as a CABAC context associated with an affine flag.

As mentioned above, the affine flag is currently signaled using a CABAC context, which is a function of the value of the affine flag(s) associated with the neighboring blocks. An example is illustrated in FIG. 8 which shows an example of affine flag context derivation for affine both AMVP and Merge. In FIG. 8, for a current CU located at x,y and size width,height, affine context, Ctx, is initialized, e.g., to 0 at 3010. At 3020, a left-neighboring CU is checked for affine. If 3020 determines that the left-neighboring CU is affine then Ctx is incremented at 3030. If 3020 determines the left-neighboring CU is not affine then an above-neighboring CU is checked for affine at 3040. If the check at 3040 determines that the above-neighboring CU is affine then Ctx is incremented at 3050 followed by the end at 3060 with the Ctx value obtained by the described operation. If the check at 3040 determines the above-neighboring CU is not affine then 3040 is followed by the end at 3060 with the Ctx value obtained. The affine flag context derived by the example embodiment illustrated in FIG. 8 may have three different values: Ctx=0 (neither left neighbor nor above neighbor is affine), or Ctx=1 (only 1 of left neighbor or above neighbor is affine), or Ctx=2 (both left and above neighbors are affine).

The same CABAC context is shared both by AMVP and merge modes. As a result, the same CABAC bin or probability model is indicated or selected for both modes. Thus, coding or decoding uses the same model for both modes. One issue is that a system such as VVC supports also other affine candidates (called virtual or constructed candidate) which are constructed without using the affine flag value of neighboring CUs. These other affine candidates use an affine motion model from individual motion vectors. Using one single context for coding affine flag for merge, AMVP and other affine candidates' modes becomes inefficient to capture the various statistical behavior of the affine flag.

Figure 9:
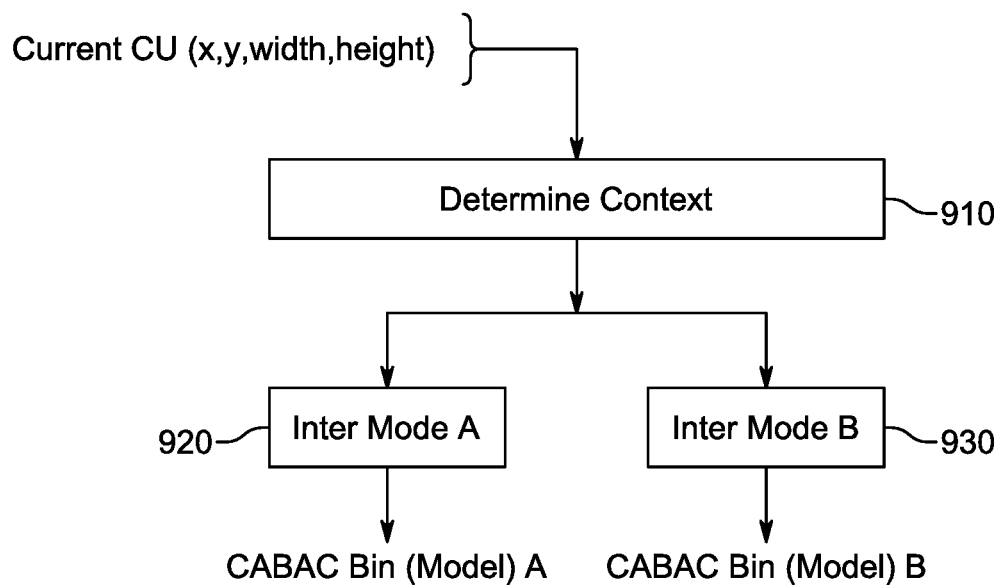
FIG. 9 illustrates an example of determining a probability model for encoding and/or decoding such as a CABAC probability model.

In general, at least one embodiment described herein takes into account the different statistical occurrences of affine mode usage between two inter-prediction modes, e.g., AMVP and merge, by coding the affine flag independently in these two modes. An example is illustrated in FIG. 9. In FIG. 9, affine context Ctx is determined or obtained for a current CU at 910. This determination of Ctx may occur in accordance with an example of an embodiment such as that shown in FIG. 8. Following the determination of Ctx, at 910, a CABAC bin or probability model for a first inter-prediction mode, e.g., affine mode, is determined or obtained at 920, e.g., based on a particular formula or relationship or a table or listing of associations or correspondence between Ctx values and CABAC bin or model. A CABAC bin or probability model for a second inter-prediction mode, e.g., merge mode, is determined or obtained at 930, e.g., based on a particular formula or relationship or a table or listing of associations or correspondence between Ctx values and CABAC bin or model. Thus, the CABAC bin or model is determined independently for each mode, i.e., for one mode at 920 and for another mode at 930.

In the example of FIG. 9, the total number of CABAC context for affine flag is doubled, i.e., three for each of first and second inter-prediction modes A and B. That is, an example of an embodiment for determining affine flag context such as in FIG. 9 can use six contexts instead of three. Stated differently, the CABAC context value can be derived in the same manner for each of two inter-prediction modes, but the probability model associated with the CABAC context can be determined independently and be different for each of two different inter-prediction modes involving the affine flag, e.g., AMVP and merge.

An example of coding the affine flag independently is illustrated by the following code involving two inter-prediction modes, i.e., affine and merge. The following example illustrates determining a CABAC context associated with each of the two modes affine and merge indicated by respective mode flags: AffineFlag and SubblockMergeFlag. As described above, derivation of the CABAC context can be the same, e.g., based on an example embodiment such as that of FIG. 8.

Mode 1—affine (AffineFlag):

. . .

unsigned ctxId=DeriveCtx::CtxAffineFlag(cu); // derive a context based on Top and Left neighbors. The context can be 0 1 or 2 cu.affine=m_BinDecoder.decodeBin(Ctx::AffineFlag (ctxId)); // use the AffineFlag associated probability model

. . .

Mode 2—merge (SubblockMergeFlag)

. . .

unsigned ctxId=DeriveCtx::CtxAffineFlag(cu); // note that the context derivation is the same as in affine cu.subblock=m_BinDecoder.decodeBin(Ctx::Subblock-MergeFlag(ctxId)); // note that the model (bin) derivation or determination is different from the affine one

. . .

Figure 10:
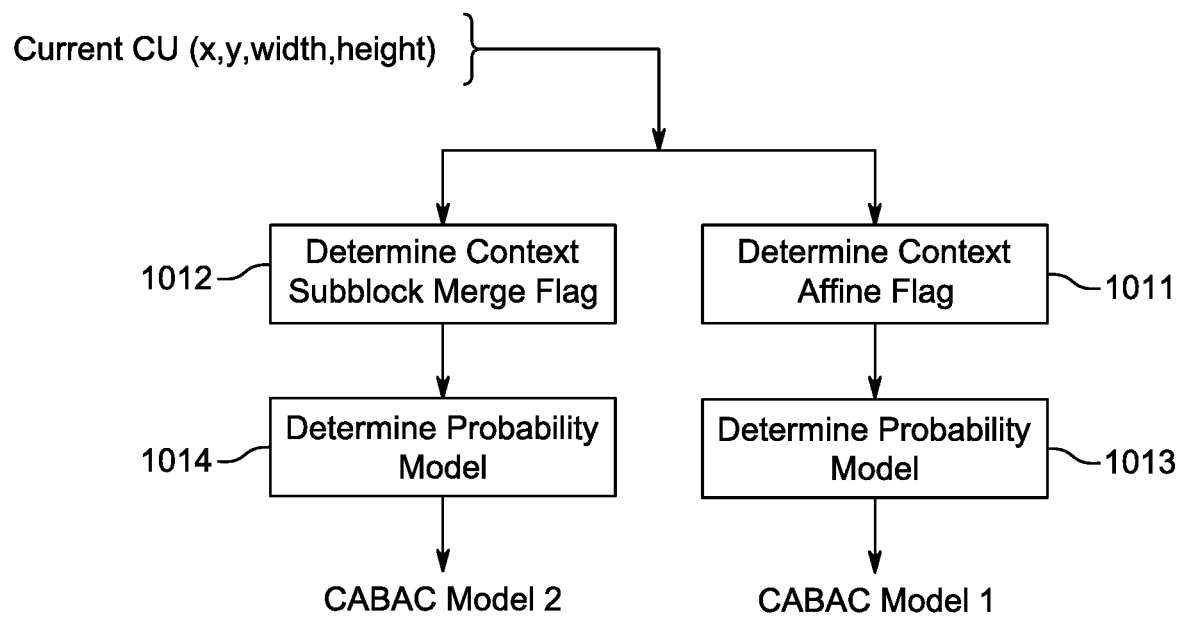
FIG. 10 illustrates another example of determining a probability model for encoding and/or decoding such as a CABAC probability model.

Another example is shown in FIG. 10. In FIGS. 10, 1011 and 1012 determine first and second CABAC contexts associated with respective first and second flags, e.g., an affine flag and a subblock merge flag. The affine flag indicates an affine mode being used. The subblock merge flag indicates either an affine mode or a second mode different from affine mode being used. The contexts are associated with the mode used. For example, the second mode can be a merge mode such as SbTMVP. First and second CABAC probability models associated with the first and second contexts and, therefore, the modes, are determined independently at 1013 and 1014.

Figure 11:
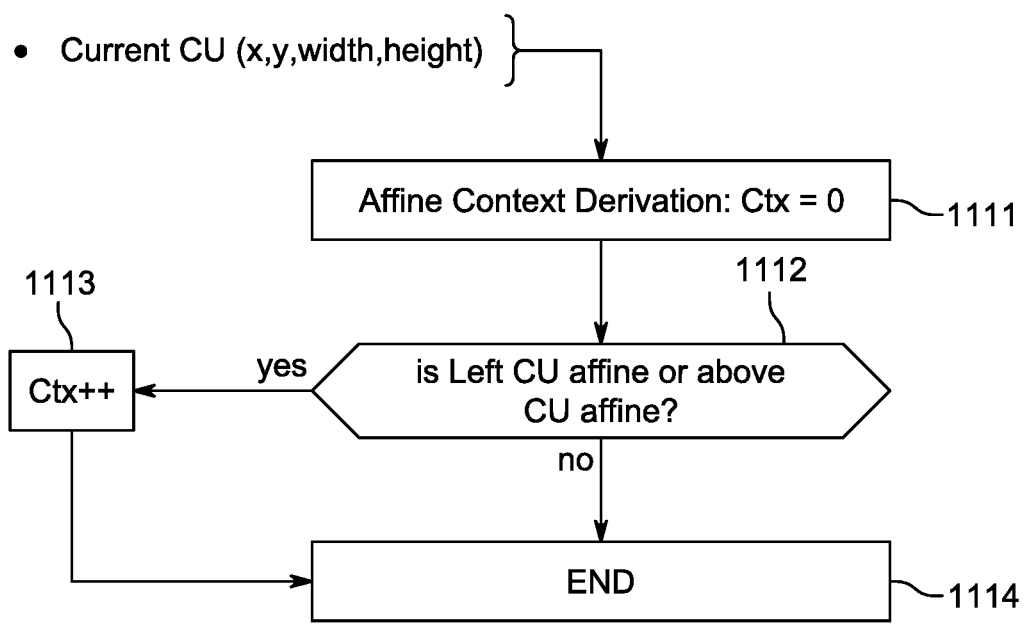
FIG. 11 through FIG. 13 illustrate various examples of embodiments for determining a context associated with a flag such as a CABAC context associated with an affine flag.

Other examples of embodiments to improve the modeling of the context comprise at least the following. One example comprises completely removing the CABAC context modeling based on spatial affine neighbors. In this case only one context is used. Another example comprises reducing the complexity of the modeling by using only the availability or not of spatial neighbors. For this example, two contexts are possible: affine neighbors are not available (context 0), or at least one is available (context 1). The example of two contexts being available is illustrated in FIG. 11. In FIG. 11, affine context Ctx is initialized at 1111, e.g., set equal to 0. At 1112, if either the left-neighboring CU or above-neighboring CU is affine then Ctx is incremented at 1113 followed by the end at 1114 where the Ctx value, e.g., 1 from 1113 is returned. If neither is affine then 1112 is followed by the end at 1114 where the Ctx value returned is either 0 or 1.

Figure 12:
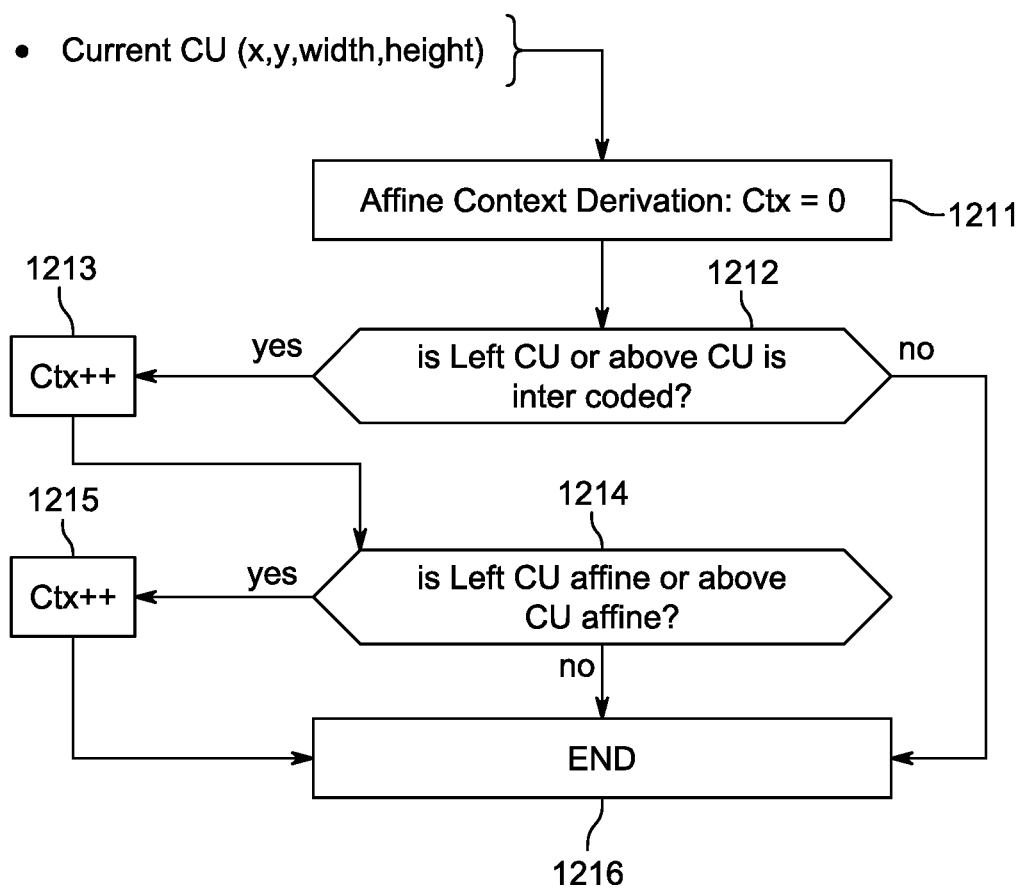
Figure 13:
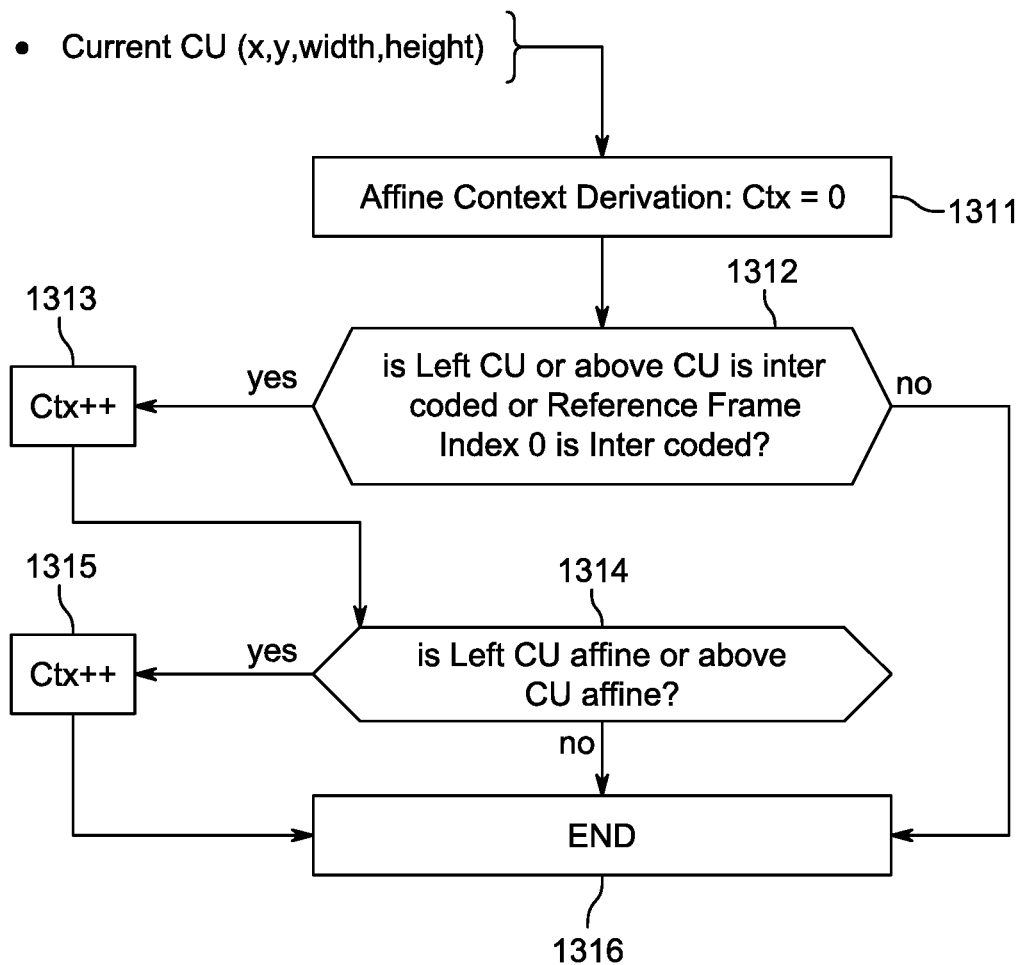

In general, at least one embodiment can include the possibility to construct a virtual affine candidate as an aspect of the context modeling, as shown in FIG. 12 which illustrates an example of context modelling for affine that takes into account virtual affine candidates. In FIG. 12 at 1211, context Ctx is initialized, e.g., set equal to zero. A virtual affine candidate can be constructed from neighboring CUs that are coded in inter mode but not in affine mode. At 1212, neighboring CUs are checked to determine if they are inter-coded. If not, 1212 is followed by the end at 1216 with the value of Ctx at the initialized value, e.g., 0. If the check at 1212 determines a neighboring CU is inter-coded then 1212 is followed by 1213 where Ctx is incremented (initial value+1). Following 1213, a check to determine if a neighboring CU is affine occurs a at 1214. If so, Ctx is incremented at 1215 ((initial value+1)+1) followed by the end at 1216 where the Ctx value is returned, else the check at 1214 is followed by the end at 1216. Summarizing the results of the arrangement in FIG. 12, the context will be:

0 if no inter neighbors are available
1 if inter neighbors are available but no affine neighbors
2 if affine neighbors are available In a variant, at least one embodiment involves the existence of a reference picture that is an inter picture can be considered, as it allows the creation of virtual temporal candidates, as illustrated by the example in FIG. 13. That is, FIG. 13 illustrates an example of context modelling for affine that takes into account virtual temporal affine candidates. A virtual temporal candidate can be constructed from temporal collocated CUs that are coded in inter mode. This example of FIG. 13 involves modifying the above-described example embodiment of context modeling in FIG. 12 by modifying 1212 in FIGS. 12 to 1312 in FIG. 13 where:

Inter neighbors are available OR an inter reference picture is available with reference picture index 0.

Other features of the embodiment of FIG. 13 correspond to similar features of FIG. 12 that are described above and will not be described again with regard to FIG. 13.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

Examples of embodiments in accordance with the present disclosure include but are not limited to the following.

In general, at least one example of an embodiment can involve a method for encoding video data, comprising: determining a first CABAC context associated with a first flag indicating use of an affine mode; determining a second CABAC context associated with a second flag indicating use of either the affine mode or a second mode different from the affine mode; wherein the first CABAC context corresponds to a first CABAC probability model; and the second CABAC context corresponds to a second CABAC probability model different from the first CABAC probability model; encoding the video data based on the first CABAC context and the first CABAC probability model during the affine mode and based on the second CABAC context and the second CABAC probability model during the second mode.

In general, at least one example of an embodiment can involve apparatus for encoding video data, comprising one or more processors, wherein the one or more processors are configured for: determining a first CABAC context associated with a first flag indicating use of an affine mode; determining a second CABAC context associated with a second flag indicating use of either the affine mode or a second mode different from the affine mode; wherein the first CABAC context corresponds to a first CABAC probability model; and the second CABAC context corresponds to a second CABAC probability model different from the first CABAC probability model; encoding the video data based on the first CABAC context and the first CABAC probability model during the affine mode and based on the second CABAC context and the second CABAC probability model during the second mode.

In general, at least one example of an embodiment can involve a method for decoding video data, comprising: determining a first CABAC context associated with a first flag indicating use of an affine mode; determining a second CABAC context associated with a second flag indicating use of either the affine mode or a second mode different from the affine mode; wherein the first CABAC context corresponds to a first CABAC probability model; and the second CABAC context corresponds to a second CABAC probability model different from the first CABAC probability model; decoding video data encoded during the affine mode based on the first CABAC context and the first CABAC probability model and decoding video data encoded during the second mode based on the second CABAC context and the second CABAC probability model.

In general, at least one example of an embodiment can involve apparatus for decoding video data, comprising one or more processors, wherein the one or more processors are configured for: determining a first CABAC context associated with a first flag indicating use of an affine mode; determining a second CABAC context associated with a second flag indicating use of either the affine mode or a second mode different from the affine mode; wherein the first CABAC context corresponds to a first CABAC probability model; and the second CABAC context corresponds to a second CABAC probability model different from the first CABAC probability model; decoding video data encoded during the affine mode based on the first CABAC context and the first CABAC probability model and decoding video data encoded during the second mode based on the second CABAC context and the second CABAC probability model.

In general, at least one example of an embodiment can involve a method for encoding video data, comprising: determining a first CABAC context associated with a first flag indicating use of an affine mode; determining a second CABAC context associated with a second flag indicating use of either the affine mode or a second mode different from the affine mode; and encoding the video data to produce encoded video data, wherein the video data produced based on the affine mode is encoded based on a first CABAC probability model associated with the first CABAC context, and the video data produced based on the second mode is encoded based on a second CABAC probability model associated with the second CABAC context and different from the first CABAC probability model.

In general, at least one example of an embodiment can involve apparatus for encoding video data, comprising one or more processors, wherein the one or more processors are configured for: determining a first CABAC context associated with a first flag indicating use of an affine mode; determining a second CABAC context associated with a second flag indicating use of either the affine mode or a second mode different from the affine mode; and encoding the video data to produce encoded video data, wherein the video data produced based on the affine mode is encoded based on a first CABAC probability model associated with the first CABAC context, and the video data produced based on the second mode is encoded based on a second CABAC probability model associated with the second CABAC context and different from the first CABAC probability model.

In general, at least one example of an embodiment can involve a method for decoding video data, comprising: determining a first CABAC context associated with a first flag indicating use of an affine mode; determining a second CABAC context associated with a second flag indicating use of either the affine mode or a second mode different from the affine mode; and decoding the video data to produce decoded video data, wherein the video data encoded based on the affine mode is decoded based on a first CABAC probability model associated with the first CABAC context, and the video data encoded based on the second mode is decoded based on a second CABAC probability model associated with the second CABAC context and different from the first CABAC probability model.

In general, at least one example of an embodiment can involve apparatus for decoding video data, comprising one or more processors, wherein the one or more processors are configured for: determining a first CABAC context associated with a first flag indicating use of an affine mode; determining a second CABAC context associated with a second flag indicating use of either the affine mode or a second mode different from the affine mode; and decoding the video data to produce decoded video data, wherein the video data encoded based on the affine mode is decoded based on a first CABAC probability model associated with the first CABAC context, and the video data encoded based on the second mode is decoded based on a second CABAC probability model associated with the second CABAC context and different from the first CABAC probability model.

In general, at least one example of an embodiment can involve a method for encoding video data, comprising: determining a first CABAC context associated with a first flag indicating use of an affine mode; determining a second CABAC context associated with a second flag indicating use of either the affine mode or a second mode different from the affine mode, wherein determining the second CABAC context occurs independently of determining the first CABAC context; and encoding the video data to produce encoded video data during the first and second modes based on the first and second flags and the first and second CABAC contexts, respectively.

In general, at least one example of an embodiment can involve apparatus for encoding video data, comprising one or more processors, wherein the one or more processors are configured for: determining a first CABAC context associated with a first flag indicating use of an affine mode; determining a second CABAC context associated with a second flag indicating use of either the affine mode or a second mode different from the affine mode, wherein determining the second CABAC context occurs independently of determining the first CABAC context; and encoding the video data to produce encoded video data during the first and second modes based on the first and second flags and the first and second CABAC contexts, respectively.

In general, at least one example of an embodiment can involve a method for decoding video data, comprising: determining a first CABAC context associated with a first flag indicating use of an affine mode; determining a second CABAC context associated with a second flag indicating use of either the affine mode or a second mode different from the affine mode, wherein determining the second CABAC context occurs independently of determining the first CABAC context; and decoding video data encoded during the first and second modes based on the first and second CABAC contexts, respectively, to produce decoded video data.

In general, at least one example of an embodiment can involve apparatus for decoding video data, comprising one or more processors, wherein the one or more processors are configured for: determining a first CABAC context associated with a first flag indicating use of an affine mode; determining a second CABAC context associated with a second flag indicating use of either the affine mode or a second mode different from the affine mode, wherein determining the second CABAC context occurs independently of determining the first CABAC context; and decoding video data encoded during the first and second modes based on the first and second CABAC contexts, respectively, to produce decoded video data.

In general, at least one example of an embodiment can involve a method for encoding video data, comprising: determining a CABAC context associated with a subblock merge mode flag indicating use of a mode comprising an affine mode or a second mode different from the affine mode; wherein the CABAC context corresponds to a first CABAC probability model during the affine mode and to a second CABAC probability model different from the first CABAC probability model during the second mode; encoding the video data based on the CABAC context, the mode and the CABAC probability model corresponding to the mode.

In general, at least one example of an embodiment can involve apparatus for encoding video data, comprising one or more processors, wherein the one or more processors are configured for: determining a CABAC context associated with a subblock merge mode flag indicating use of a mode comprising an affine mode or a second mode different from the affine mode; wherein the CABAC context corresponds to a first CABAC probability model during the affine mode and to a second CABAC probability model different from the first CABAC probability model during the second mode; encoding the video data based on the CABAC context, the mode and the CABAC probability model corresponding to the mode.

In general, at least one example of an embodiment can involve a method for decoding video data, comprising: determining a CABAC context associated with a subblock merge mode flag indicating use of a mode comprising an affine mode or a second mode different from the affine mode; wherein the CABAC context corresponds to a first CABAC probability model during the affine mode and to a second CABAC probability model different from the first CABAC probability model during the second mode; decoding video data encoded based on the affine mode based on the first CABAC probability model and decoding video data encoded based on the second mode based on the second CABAC context.

In general, at least one example of an embodiment can involve apparatus for decoding video data, comprising one or more processors, wherein the one or more processors are configured for: determining a CABAC context associated with a subblock merge mode flag indicating use of a mode comprising an affine mode or a second mode different from the affine mode; wherein the CABAC context corresponds to a first CABAC probability model during the affine mode and to a second CABAC probability model different from the first CABAC probability model during the second mode; decoding video data encoded based on the affine mode based on the first CABAC probability model and decoding video data encoded based on the second mode based on the second CABAC context.

In general, at least one example of an embodiment can involve a method or apparatus in accordance with any embodiment described herein, wherein the affine mode comprises an AMVP mode, and the second mode comprises a merge mode.

In general, at least one example of an embodiment can involve a method or apparatus in accordance with any embodiment described herein, wherein the affine mode comprises an AMVP mode and the second mode comprises one of merge, SbTMVP, mmvd, or DMVR.

In general, at least one example of an embodiment can involve a method or apparatus in accordance with any embodiment described herein, wherein determining a CABAC context such as a first or second CABAC context does not consider spatial affine neighbors.

In general, at least one example of an embodiment can involve a method or apparatus in accordance with any embodiment described herein, wherein a CABAC context such as a first or second CABAC context has only one context.

In general, at least one example of an embodiment can involve a method or apparatus in accordance with any embodiment described herein, wherein determining a CABAC context such as a first or second CABAC context is based only on the availability or not of spatial neighbors.

In general, at least one example of an embodiment can involve a method or apparatus in accordance with any embodiment described herein, and comprising constructing a virtual affine candidate to be considered when determining a CABAC context such as a first or second CABAC context.

In general, at least one example of an embodiment can involve a method or apparatus in accordance with any embodiment described herein involving a virtual affine candidate, wherein constructing the virtual affine candidate is based on neighbor CUs coded in inter mode and not in affine mode.

In general, at least one example of an embodiment can involve a method or apparatus in accordance with any embodiment described herein involving constructing a virtual affine candidate based on neighbor CUs coded in inter mode, wherein a CABAC context will comprise one of: 0 if no inter neighbors are available; 1 if inter neighbors are available but no affine neighbors; 2 if affine neighbors are available.

In general, at least one example of an embodiment can involve a method or apparatus in accordance with any embodiment described herein, and further comprising considering an existence of a reference picture that is an inter picture for enabling creation of a virtual temporal candidate.

In general, at least one example of an embodiment can involve a method or apparatus in accordance with any embodiment described herein involving constructing a virtual temporal candidate, wherein the virtual temporal candidate can be constructed based on temporal collocated CUs that are coded in inter mode.

In general, at least one example of an embodiment can involve a method or apparatus in accordance with any embodiment described herein involving constructing a virtual temporal candidate based on collocated CUs coded in inter mode, wherein determining a context comprises: inter neighbors are available OR an inter reference picture is available with reference picture index 0.

In general, at least one example of an embodiment can involve a computer program product comprising computing instructions for performing a method according to any embodiment described herein when executed by one or more processors.

In general, at least one example of an embodiment can involve a non-transitory computer readable medium storing executable program instructions to cause a computer executing the instructions to perform a method according to any embodiment described herein.

In general, at least one example of an embodiment can involve a bitstream, formatted to include encoded video data, wherein the encoded video data include: an indicator associated with obtaining a CABAC context according to any method described herein; and picture data encoded based on the CABAC context.

In general, at least one example of an embodiment can involve a device comprising: an apparatus according to any embodiment described herein; and at least one of (i) an antenna configured to receive a signal, the signal including data representative of the video data, (ii) a band limiter configured to limit the received signal to a band of frequencies that includes the data representative of the video data, and (iii) a display configured to display an image from the video data.

In general, at least one example of an embodiment can involve an apparatus for encoding video data, comprising one or more processors, wherein the one or more processors are configured for: determining a first CABAC context associated with a flag indicating use of an affine motion model during a first inter-prediction mode; determining a second CABAC context different from the first CABAC context and associated with the flag indicating use of the affine motion model during a second inter-prediction mode different from the first inter-prediction mode; and encoding the video data to produce encoded video data, wherein the video data produced based on the affine motion model during the first inter-prediction mode is encoded based on a first CABAC probability model associated with the first CABAC context, and the video data produced based on the affine motion model during the second inter-prediction mode is encoded based on a second CABAC probability model associated with the second CABAC context.

In general, at least one other example of an embodiment can involve a method for encoding video data, comprising:

determining a first CABAC context associated with a flag indicating use of an affine motion model during a first inter-prediction mode; determining a second CABAC context different from the first CABAC context and associated with the flag indicating use of the affine motion model during a second inter-prediction mode different from the first inter-prediction mode; and encoding the video data to produce encoded video data, wherein the video data produced based on the affine motion model during the first inter-prediction mode is encoded based on a first CABAC probability model associated with the first CABAC context, and the video data produced based on the affine motion model during the second inter-prediction mode is encoded based on a second CABAC probability model associated with the second CABAC context.

In general, at least one other example of an embodiment can involve an apparatus for decoding video data, comprising one or more processors, wherein the one or more processors are configured for: determining a first CABAC context associated with a flag indicating use of an affine motion model during a first inter-prediction mode; determining a second CABAC context different from the first CABAC context and associated with the flag indicating use of the affine motion model during a second inter-prediction mode different from the first inter-prediction mode; and decoding the video data to produce decoded video data, wherein the video data produced based on the affine motion model during the first inter-prediction mode is decoded based on a first CABAC probability model associated with the first CABAC context, and the video data produced based on the affine motion model during the second inter-prediction mode is decoded based on a second CABAC probability model associated with the second CABAC context.

In general, at least one other example of an embodiment can involve a method for decoding video data, comprising: determining a first CABAC context associated with a flag indicating use of an affine motion model during a first inter-prediction mode; determining a second CABAC context different from the first CABAC context and associated with the flag indicating use of the affine motion model during a second inter-prediction mode different from the first inter-prediction mode; and decoding the video data to produce decoded video data, wherein the video data produced based on the affine motion model during the first inter-prediction mode is decoded based on a first CABAC probability model associated with the first CABAC context, and the video data produced based on the affine motion model during the second inter-prediction mode is decoded based on a second CABAC probability model associated with the second CABAC context.

In general, at least one other example of an embodiment can involve an apparatus for encoding video data, comprising one or more processors, wherein the one or more processors are configured for: determining a first CABAC context associated with an affine motion compensation flag during a first inter-prediction mode; determining a second CABAC context associated with the affine motion compensation flag during a second inter-prediction mode different from the first inter-prediction mode, wherein determining the second CABAC context occurs independently of determining the first CABAC context; and encoding the video data to produce encoded video data during the first and second inter-prediction modes based on the affine motion compensation flag and the first and second CABAC contexts, respectively.

In general, at least one other example of an embodiment can involve a method for encoding video data, comprising: determining a first CABAC context associated with an affine motion compensation flag during a first inter-prediction mode; determining a second CABAC context associated with the affine motion compensation flag during a second inter-prediction mode different from the first inter-prediction mode, wherein determining the second CABAC context occurs independently of determining the first CABAC context; and encoding the video data to produce encoded video data during the first and second inter-prediction modes based on the affine motion compensation flag and the first and second CABAC contexts, respectively.

In general, at least one other example of an embodiment can involve an apparatus for decoding video data, comprising one or more processors, wherein the one or more processors are configured for: determining a first CABAC context associated with an affine motion compensation flag during a first inter-prediction mode; determining a second CABAC context associated with the affine motion compensation flag during a second inter-prediction mode different from the first inter-prediction mode, wherein determining the second CABAC context occurs independently of determining the first CABAC context; and decoding the video data to produce decoded video data during the first and second inter-prediction modes based on the affine motion compensation flag and the first and second CABAC contexts, respectively.

In general, at least one other example of an embodiment can involve a method for decoding video data, comprising: determining a first CABAC context associated with an affine motion compensation flag during a first inter-prediction mode; determining a second CABAC context associated with the affine motion compensation flag during a second inter-prediction mode different from the first inter-prediction mode, wherein determining the second CABAC context occurs independently of determining the first CABAC context; and decoding the video data to produce decoded video data during the first and second inter-prediction modes based on the affine motion compensation flag and the first and second CABAC contexts, respectively.

In general, at least one other example of an embodiment can involve An apparatus for encoding video data, comprising one or more processors, wherein the one or more processors are configured for: determining an inter-prediction mode; obtaining a first CABAC context associated with an affine motion compensation flag based on the inter-prediction mode being a first mode; obtaining a second CABAC context associated with the affine motion compensation flag based on the inter-prediction mode being a second mode different from the first mode, wherein obtaining the second CABAC context occurs independently of obtaining the first CABAC context; and encoding the video data to produce encoded video data during the first and second modes based on the affine motion compensation flag and the first and second CABAC contexts, respectively.

In general, at least one other example of an embodiment can involve a method for encoding video data, comprising: determining an inter-prediction mode; obtaining a first CABAC context associated with an affine motion compensation flag based on the inter-prediction mode being a first mode; obtaining a second CABAC context associated with the affine motion compensation flag based on the inter-prediction mode being a second mode different from the first mode, wherein obtaining the second CABAC context occurs independently of obtaining the first CABAC context; and encoding the video data to produce encoded video data during the first and second modes based on the affine motion compensation flag and the first and second CABAC contexts, respectively.

In general, at least one other example of an embodiment can involve an apparatus for decoding video data, comprising one or more processors, wherein the one or more processors are configured for: determining an inter-prediction mode; obtaining a first CABAC context associated with an affine motion compensation flag based on the inter-prediction mode being a first mode; obtaining a second CABAC context associated with the affine motion compensation flag based on the inter-prediction mode being a second mode different from the first mode, wherein obtaining the second CABAC context occurs independently of obtaining the first CABAC context; and decoding the video data to produce decoded video data during the first and second modes based on the affine motion compensation flag and the first and second CABAC contexts, respectively.

In general, at least one other example of an embodiment can involve a method for decoding video data, comprising: determining an inter-prediction mode; obtaining a first CABAC context associated with an affine motion compensation flag based on the inter-prediction mode being a first mode; obtaining a second CABAC context associated with the affine motion compensation flag based on the inter-prediction mode being a second mode different from the first mode, wherein obtaining the second CABAC context occurs independently of obtaining the first CABAC context; and decoding the video data to produce decoded video data during the first and second modes based on the affine motion compensation flag and the first and second CABAC contexts, respectively.

In general, at least one other example of an embodiment can involve an apparatus for encoding video data, comprising one or more processors, wherein the one or more processors are configured for: determining a CABAC context associated with a flag indicating use of an affine motion model during an inter-prediction mode; wherein the CABAC context corresponds to a first CABAC probability model for the inter-prediction mode being a first mode; and the CABAC context corresponds to a second CABAC probability model different from the first CABAC probability model for the inter-prediction mode being a second mode different from the first mode; encoding the video data based on the flag, the CABAC context, the inter-prediction mode and one of the first and second CABAC probability models corresponding to the inter-prediction mode.

In general, at least one other example of an embodiment can involve a method for encoding video data, comprising: determining a CABAC context associated with a flag indicating use of an affine motion model during an inter-prediction mode; wherein the CABAC context corresponds to a first CABAC probability model for the inter-prediction mode being a first mode; and the CABAC context corresponds to a second CABAC probability model different from the first CABAC probability model for the inter-prediction mode being a second mode different from the first mode; encoding the video data based on the flag, the CABAC context, the inter-prediction mode and one of the first and second CABAC probability models corresponding to the inter-prediction mode.

In general, at least one other example of an embodiment can involve an apparatus for decoding video data, comprising: one or more processors, wherein the one or more processors are configured for: determining a CABAC context associated with a flag indicating use of an affine motion model during an inter-prediction mode; wherein the CABAC context corresponds to a first CABAC probability model for the inter-prediction mode being a first mode; and the CABAC context corresponds to a second CABAC probability model different from the first CABAC probability model for the inter-prediction mode being a second mode different from the first mode; decoding the video data based on the flag, the CABAC context, the inter-prediction mode and one of the first and second CABAC probability models corresponding to the inter-prediction mode.

In general, at least one other example of an embodiment can involve a method for decoding video data, comprising: determining a CABAC context associated with a flag indicating use of an affine motion model during an inter-prediction mode; wherein the CABAC context corresponds to a first CABAC probability model for the inter-prediction mode being a first mode; and the CABAC context corresponds to a second CABAC probability model different from the first CABAC probability model for the inter-prediction mode being a second mode different from the first mode; decoding the video data based on the flag, the CABAC context, the inter-prediction mode and one of the first and second CABAC probability models corresponding to the inter-prediction mode.

In general, at least one other example of an embodiment can involve an apparatus for encoding video data, comprising one or more processors, wherein the one or more processors are configured for: obtaining a flag indicating use of an affine motion model; determining a CABAC context associated with the flag, wherein the CABAC context is the only CABAC context associated with the flag and is determined without CABAC context modeling based on spatial affine neighbors of a current coding unit; and encoding the video data to produce encoded video data based on the affine flag and the CABAC context.

In general, at least one other example of an embodiment can involve a method for encoding video data, comprising: obtaining a flag indicating use of an affine motion model; determining a CABAC context associated with the flag, wherein the CABAC context is the only CABAC context associated with the flag and is determined without CABAC context modeling based on spatial affine neighbors of a current coding unit; and encoding the video data to produce encoded video data based on the affine flag and the CABAC context.

In general, at least one other example of an embodiment can involve an apparatus for decoding video data, comprising: one or more processors, wherein the one or more processors are configured for: obtaining a flag indicating use of an affine motion model; determining a CABAC context associated with the flag, wherein the CABAC context is the only CABAC context associated with the flag and is determined without CABAC context modeling based on spatial affine neighbors of a current coding unit; and decoding the video data to produce decoded video data based on the affine flag and the CABAC context.

In general, at least one other example of an embodiment can involve a method for decoding video data, comprising: obtaining a flag indicating use of an affine motion model; determining a CABAC context associated with the flag, wherein the CABAC context is the only CABAC context associated with the flag and is determined without CABAC context modeling based on spatial affine neighbors of a current coding unit; and decoding the video data to produce decoded video data based on the affine flag and the CABAC context.

In general, at least one other example of an embodiment can involve an apparatus for encoding video data, comprising one or more processors, wherein the one or more processors are configured for: determining a CABAC context associated with a flag indicating use of an affine motion model during an inter-prediction mode based only on an availability of an affine spatial neighbor of a current coding unit, wherein the CABAC context is one of a first context corresponding to the availability indicating no spatial affine neighbors are available, or a second context corresponding to the availability indicating at least one spatial affine neighbor is available; obtaining a CABAC probability model based on the CABAC context; and encoding the video data based on the flag, the CABAC context, and the CABAC probability model corresponding to the CABAC context.

In general, at least one other example of an embodiment can involve a method for encoding video data, comprising: determining a CABAC context associated with a flag indicating use of an affine motion model during an inter-prediction mode based only on an availability of an affine spatial neighbor of a current coding unit, wherein the CABAC context is one of a first context corresponding to the availability indicating no spatial affine neighbors are available, or a second context corresponding to the availability indicating at least one spatial affine neighbor is available; obtaining a CABAC probability model based on the CABAC context; and encoding the video data based on the flag, the CABAC context, and the CABAC probability model corresponding to the CABAC context.

In general, at least one other example of an embodiment can involve an apparatus for decoding video data, comprising one or more processors, wherein the one or more processors are configured for: determining a CABAC context associated with a flag indicating use of an affine motion model during an inter-prediction mode based only on an availability of an affine spatial neighbor of a current coding unit, wherein the CABAC context is one of a first context corresponding to the availability indicating no spatial affine neighbors are available, or a second context corresponding to the availability indicating at least one spatial affine neighbor is available obtaining a CABAC probability model based on the CABAC context; and decoding the video data based on the flag, the CABAC context, and the CABAC probability model corresponding to the CABAC context.

In general, at least one other example of an embodiment can involve a method for decoding video data, comprising: determining a CABAC context associated with a flag indicating use of an affine motion model during an inter-prediction mode based only on an availability of an affine spatial neighbor of a current coding unit, wherein the CABAC context is one of a first context corresponding to the availability indicating no spatial affine neighbors are available, or a second context corresponding to the availability indicating at least one spatial affine neighbor is available; obtaining a CABAC probability model based on the CABAC context; and decoding the video data based on the flag, the CABAC context, and the CABAC probability model corresponding to the CABAC context.

Figure 14:
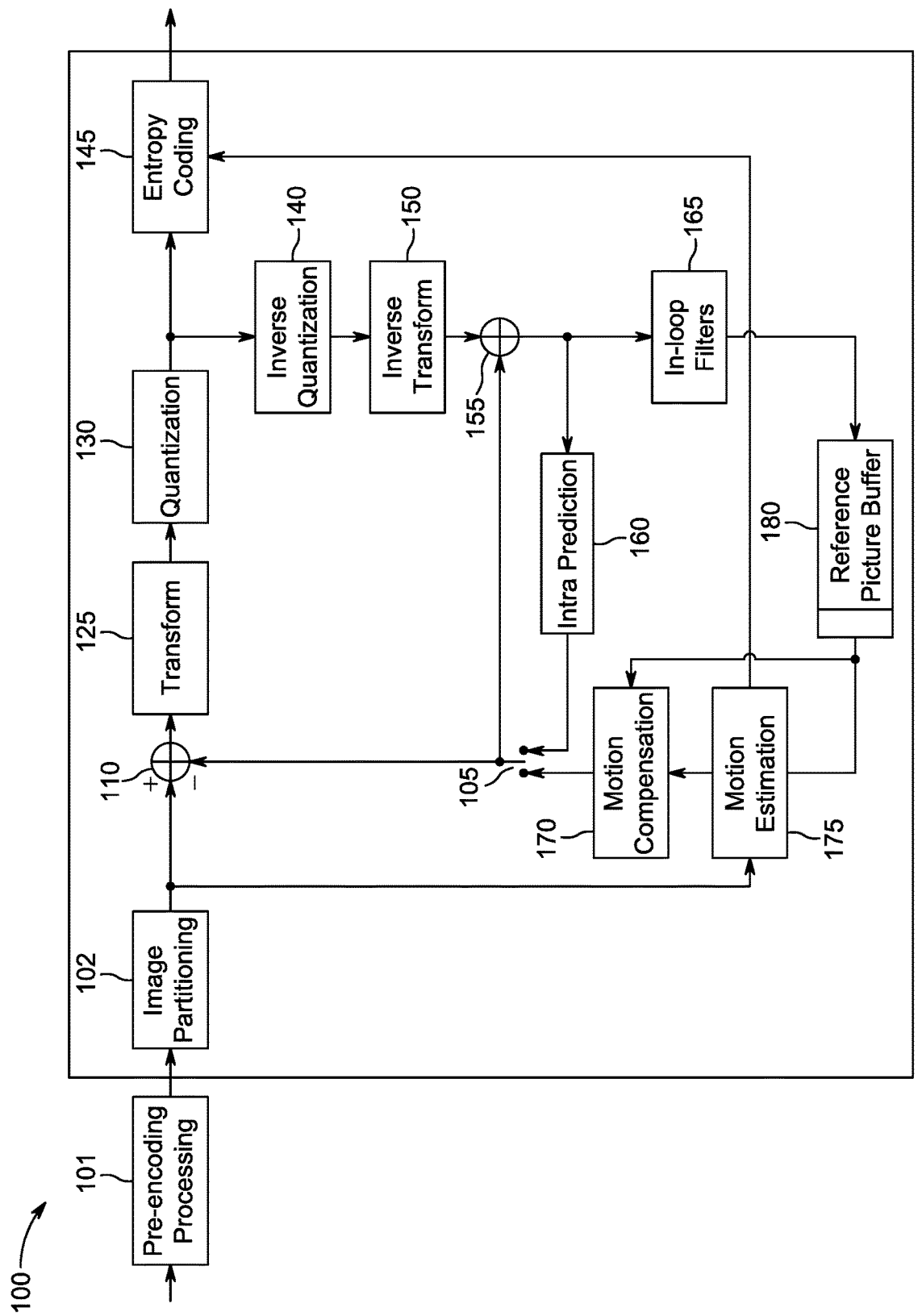
FIG. 14 illustrates an example of an embodiment of an encoder suitable for encoding video data in accordance with one or more of the examples of embodiments described herein.
Figure 15:
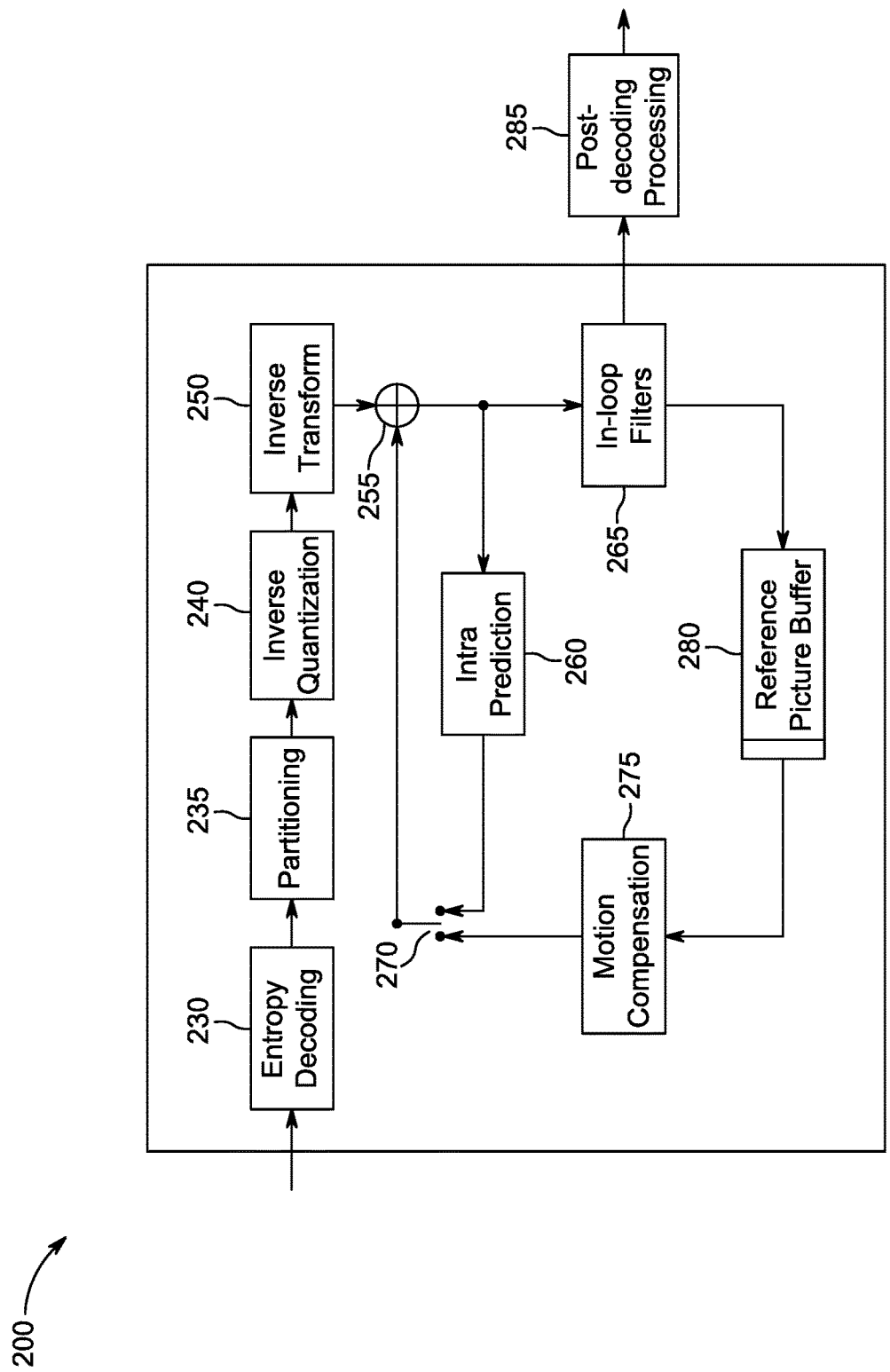
FIG. 15 illustrates an example of an embodiment of a decoder suitable for decoding video data in accordance with one or more of the examples of embodiments described herein.
Figure 16:
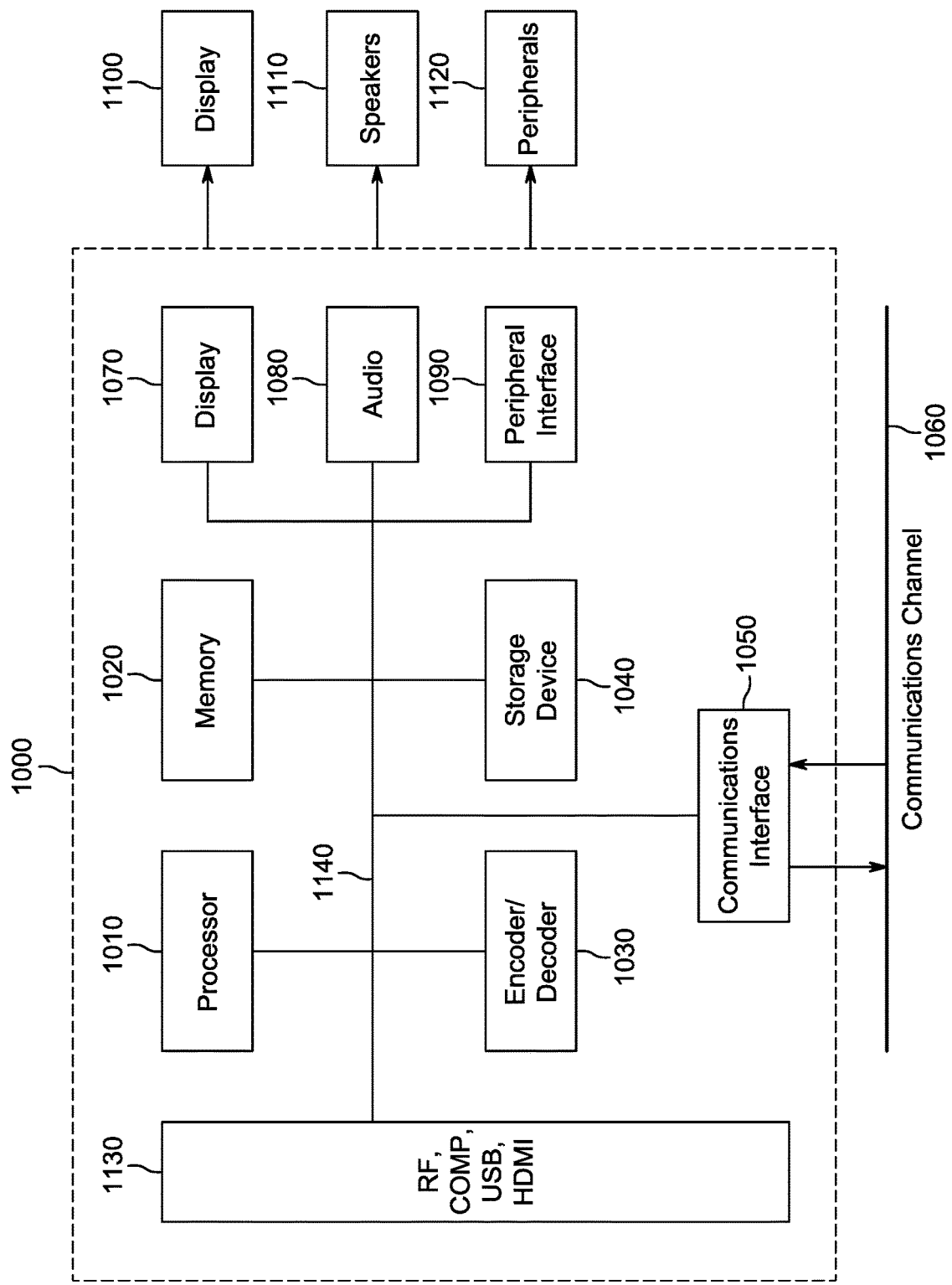
FIG. 16 illustrates an example of an embodiment of a system suitable for encoding and/or decoding video data in accordance with one or more of the examples of embodiments described herein.

The various examples of embodiments described and contemplated in this document can be implemented in many different forms. FIGS. 14, 15 and 16 provide some examples of embodiments as described below, but other embodiments are contemplated and the discussion of FIGS. 14, 15 and 16 does not limit the breadth of the implementations. At least one of the aspects generally relates to video encoding and decoding, and at least one other aspect generally relates to transmitting a bitstream generated or encoded. These and other embodiments, features, aspects, etc., can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the entropy coding, and/or decoding modules 145 and 230 of a video encoder 100 and decoder 200, respectively, as shown in FIG. 14 and FIG. 15. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, {{1,0}, {3,1}, {1,1}}. The specific values are for example purposes and the aspects described are not limited to these specific values.

FIG. 13 illustrates an example of an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 15 illustrates a block diagram of an example of a video decoder 200. In the decoder 200, a bitstream is decoded by the decoder elements as described below. Video decoder 200 generally performs a decoding pass reciprocal to the encoding pass as described in regard to FIG. 14. The encoder 100 also generally performs video decoding as part of encoding video data.

The input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 16 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast, external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a wireless network, such as IEEE 802.11. The wireless signal of these embodiments is received over the communications channel 1060 and the communications interface 1050 which are adapted for Wi-Fi communications, for example. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting an index of weights to be used for the various intra prediction reference arrays.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, weighting of intra prediction reference arrays.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion calculation or rate distortion optimization. During the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of weights to be used for intra prediction reference arrays. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Embodiments may include one or more of the following features or entities, alone or in combination, across various different claim categories and types:

Encoding and decoding of the affine mode to take into account the different statistical occurrences of affine mode usage between AMVP and merge.

Encoding and decoding of the affine mode to take into account the different statistical occurrences of affine mode usage between AMVP and merge by coding the affine flag independently in the AMVP and merge modes.

Encoding and decoding of the affine mode to take into account the different statistical occurrences of affine mode usage between AMVP and merge by coding the affine flag independently in the AMVP and merge modes, wherein the total number of CABAC context for affine flag is doubled.

Encoding and decoding of the affine mode to take into account the different statistical occurrences of affine mode usage between AMVP and merge by coding the affine flag independently in the AMVP and merge modes, wherein the total number of CABAC context for affine flag is doubled, and wherein with actual affine flag context modelling uses six contexts instead of three.

Remove the CABAC context modeling based on spatial affine neighbors.

Remove the CABAC context modeling based on spatial affine neighbors using only one context.

Modeling the context using only the availability or not of spatial neighbors.

Modeling the context using only the availability or not of spatial neighbors, wherein two contexts are possible: affine neighbors are not available (context 0), or at least one is available (context 1).

Construct a virtual affine candidate to be considered in the context modeling constructed from neighbor CUs that are coded in inter mode but not in affine mode.

Construct a virtual affine candidate to be considered in the context modeling constructed from neighbor CUs that are coded in inter mode but not in affine mode, wherein the context will then be:
0 if no inter neighbors are available
1 if inter neighbors are available but no affine neighbors
2 if affine neighbors are available Consider existence of a reference picture that is an inter picture for enabling creation of virtual temporal candidates.

Consider existence of a reference picture that is an inter picture for enabling creation of virtual temporal candidates, wherein a virtual temporal candidate can be constructed from temporal collocated CUs that are coded in inter mode.

Consider existence of a reference picture that is an inter picture for enabling creation of virtual temporal candidates, wherein a virtual temporal candidate can be constructed from temporal collocated CUs that are coded in inter mode, and wherein the context modeling comprises:
Inter neighbors are available OR an inter reference picture is available with reference picture index 0.

A bitstream or signal that includes one or more of the described syntax elements, or variations thereof.

Inserting in the signaling syntax elements that enable the decoder to provide affine mode processing in a manner corresponding to that used by an encoder.

Selecting, based on these syntax elements, affine mode processing to apply at the decoder.

Creating and/or transmitting and/or receiving and/or decoding a bitstream or signal that includes one or more of the described syntax elements, or variations thereof.

A TV, set-top box, cell phone, tablet, or other electronic device that performs any of the embodiments described.

A TV, set-top box, cell phone, tablet, or other electronic device that performs any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs any of the embodiments described.

A TV, set-top box, cell phone, tablet, or other electronic device that receives (e.g. using an antenna) a signal over the air that includes an encoded image, and performs any of the embodiments described.

A computer program product storing program code that, when executed by a computer implements any of the embodiments described.

A non-transitory computer readable medium including executable program instructions causing a computer executing the instructions to implement any of the embodiments described.

Various other generalized, as well as particularized embodiments are also supported and contemplated throughout this disclosure.

The invention claimed is:

1. A method, comprising:
deriving a CABAC context, the CABAC context being used for encoding a first flag indicating use of an affine motion model for a video block when the video block is in a first inter mode, and the same CABAC context being used for encoding a second flag indicating use of an affine motion model for the video block when the video block is in a second inter mode;
wherein the CABAC context is associated to a first CABAC probability model when the video block is in the first inter mode and the same CABAC context is associated to a second CABAC probability model when the video block is in the second inter mode, the second CABAC probability model being different from the first CABAC probability model;
the first inter mode being a mode wherein a motion vector difference with a motion predictor is coded for the video block, and the second inter mode being a mode wherein the motion vector difference is inferred to be zero for the video block; and
encoding the video block using the first flag and the first CABAC probability model during the first inter mode and using the second flag and the second CABAC probability model during the second inter mode.

2. The method of claim 1, wherein the affine motion model is signaled using three CABAC contexts, each one of the three CABAC contexts being associated to two probability models, wherein one of the two probability models is used for the derived CABAC context depending on whether the affine motion model is used in the first inter mode or in the second inter mode.

3. The method of claim 1, wherein deriving the CABAC context considers spatial affine neighbors.

4. The method of claim 1, wherein the affine motion model is encoded independently in the first inter mode and in the second inter mode.

5. An apparatus, comprising:
one or more processors, wherein the one or more processors are configured for:
deriving a CABAC context, the CABAC context being used for encoding a first flag indicating use of an affine motion model for a video block when the video block is in a first inter mode, and the same CABAC context being used for encoding a second flag indicating use of an affine motion model for the video block when the video block is in a second inter mode;
wherein the CABAC context is associated to a first CABAC probability model when the video block is in the first inter mode and the same CABAC context is associated to a second CABAC probability model when the video block is in the second inter mode, the second CABAC probability model being different from the first CABAC probability model;
the first inter mode being a mode wherein a motion vector difference with a motion predictor is coded for the video block, and the second inter mode being a mode wherein the motion vector difference is inferred to be zero for the video block; and
encoding the vide block using the first flag and the first CABAC probability model during the first inter mode and using the second flag and the second CABAC probability model during the second inter mode.

6. A method, comprising:
deriving a CABAC context, the CABAC context being used for decoding a first flag indicating use of an affine motion model for a video block when the video block is in a first inter mode, and the same CABAC context being used for decoding a second flag indicating use of an affine motion model for the video block when the video block is in a second inter mode;
wherein the CABAC context is associated to a first CABAC probability model when the video block is in the first inter mode and the same CABAC context is associated to a second CABAC probability model when the video block is in the second inter mode, the second CABAC probability model being different from the first CABAC probability model;
the first inter mode being a mode wherein a motion vector difference with a motion predictor is coded for the video block, and the second inter mode being a mode wherein the motion vector difference is inferred to be zero for the video block; and
decoding the video block using the first flag and the first CABAC probability model during the first inter mode and using the second flag and the second CABAC probability model during the second inter mode.

7. A non-transitory computer readable medium storing executable program instructions to cause a computer executing the instructions to perform the method according to claim 6.

8. An apparatus, comprising:
one or more processors, wherein the one or more processors are configured for:
deriving a CABAC context, the CABAC context being used for decoding a first flag indicating use of an affine motion model for a video block when the video block is in a first inter mode, and the same CABAC context being used for decoding a second flag indicating use of an affine motion model for the video block when the video block is in a second inter mode;
wherein the CABAC context is associated to a first CABAC probability model when the video block is in the first inter mode and the same CABAC context is associated to a second CABAC probability model when the video block is in the second inter mode, the second CABAC probability model being different from the first CABAC probability model;
the first inter mode being a mode wherein a motion vector difference with a motion predictor is coded for the video block, and the second inter mode being a mode wherein the motion vector difference is inferred to be zero for the video block; and
decoding the video block using the first flag and the first CABAC probability model during the first inter mode and using the second flag and the second CABAC probability model during the second inter mode.

9. The apparatus of claim 8, wherein the first inter mode comprises an AMVP mode and the second inter mode is a merge mode that comprises one of SbTMVP, mmvd, or DMVR.

10. The apparatus of claim 9, wherein deriving the CABAC context does not consider spatial affine neighbors.

11. The apparatus of claim 10, wherein the CABAC context has only one context.

12. The apparatus of claim 8, wherein deriving the CABAC context is based only on the availability or not of spatial neighbors.

13. The apparatus of claim 8, wherein the one or more processors are further configured for constructing a virtual affine candidate to be considered when determining the CABAC context.

14. The apparatus of claim 13, wherein constructing the virtual affine candidate is based on neighbor coding units coded in the first inter mode.

15. The apparatus of claim 14, wherein the CABAC context comprises one of:
   0 if no inter neighbors are available;
   1 if inter neighbors are available but no affine neighbors; and
   2 if affine neighbors are available.

16. The apparatus of claim 8, wherein deriving the CABAC context comprises: inter neighbors are available or an inter reference picture is available with reference picture index 0.

17. The apparatus of claim 8, wherein the affine motion model is signaled using three CABAC contexts, each one of the three CABAC contexts being associated to two probability models, wherein one of the two probability models is used for the derived CABAC context depending on whether the affine motion model is used in the first inter mode or in the second inter mode.

18. The apparatus of claim 8, wherein the affine motion model is encoded independently in the first inter mode and in the second inter mode.

19. A device comprising:
   an apparatus according to claim 8; and
   at least one of:
      an antenna configured to receive a signal, the signal including data representative of the video data;
      a band limiter configured to limit the received signal to a band of frequencies that includes the data representative of the video data; or
      a display configured to display an image from the video data.

20. The method of claim 6, wherein deriving the CABAC context is done in a same manner whether the video block is in the first inter mode or the video block is in the second inter mode.

21. The apparatus of claim 8, wherein deriving the CABAC context is done in a same manner whether the video block is in the first inter mode or the video block is in the second inter mode.

* * * * *